United States Patent
Forin

(10) Patent No.: US 6,360,220 B1
(45) Date of Patent: Mar. 19, 2002

(54) LOCK-FREE METHODS AND SYSTEMS FOR ACCESSING AND STORING INFORMATION IN AN INDEXED COMPUTER DATA STRUCTURE HAVING MODIFIABLE ENTRIES

(75) Inventor: Alessandro Forin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/223,968

(22) Filed: Dec. 31, 1998

Related U.S. Application Data

(60) Provisional application No. 60/095,297, filed on Aug. 4, 1998.

(51) Int. Cl.[7] .............................................. G06F 17/30
(52) U.S. Cl. ............................................ 707/8; 707/201
(58) Field of Search ................................ 707/1, 2, 3, 4, 707/5, 6, 8, 201

(56) References Cited

U.S. PATENT DOCUMENTS

| | | | | |
|---|---|---|---|---|
| 5,187,790 A | * | 2/1993 | East et al. | 709/316 |
| 5,307,487 A | * | 4/1994 | Tavares et al. | 707/8 |
| 5,432,784 A | | 7/1995 | Oezveren | 370/235 |
| 5,701,432 A | * | 12/1997 | Wong et al. | 711/130 |
| 5,799,195 A | | 8/1998 | Ross | 710/266 |
| 5,918,229 A | * | 6/1999 | Davids et al. | 707/10 |
| 5,924,098 A | * | 7/1999 | Kluge | 707/100 |
| 5,946,711 A | * | 8/1999 | Donnelly | 711/152 |
| 5,953,530 A | * | 9/1999 | Rishi et al. | 717/4 |
| 5,991,797 A | * | 11/1999 | Futral et al. | 709/216 |
| 6,009,269 A | * | 12/1999 | Burrows et al. | 717/4 |
| 6,047,283 A | * | 4/2000 | Braun | 707/3 |
| 6,067,604 A | * | 5/2000 | Ramachandran et al. | 711/149 |
| 6,078,994 A | * | 6/2000 | Carey | 711/133 |
| 6,088,044 A | * | 7/2000 | Kwok et al. | 345/505 |
| 6,115,802 A | * | 9/2000 | Tock et al. | 711/216 |
| 6,167,402 A | * | 12/2000 | Yeager | 707/10 |

FOREIGN PATENT DOCUMENTS

| | | |
|---|---|---|
| EP | 674 414 | 9/1995 |
| EP | 0 902 355 | 1/2000 |
| GB | 1 595 740 | 8/1981 |
| WO | WO 98/30969 | 7/1998 |

OTHER PUBLICATIONS

Tanenbaum, Andrew S., "Structured Computer Organization", Prentice–Hall, Inc., Second Edition, pp. 308–341.*

Welsh, M. et al., "Memory Management for User–Level Network Interfaces", *IEEE Micro*, vol. 18, No. 2, pp. 77–82, Mar. 1, 1998.

Blumrich M. A., et al., "Virtual Memory Mapped Network Interface for the Shrimp Multicomputer", *Computer Architecture News*, vol. 22, No. 2, pp. 142–153, Apr. 1, 1994.

(List continued on next page.)

*Primary Examiner*—Thomas Black
*Assistant Examiner*—Mary Wang
(74) *Attorney, Agent, or Firm*—Leydig, Voit & Mayer, Ltd.

(57) ABSTRACT

Lock-free methods and systems for accessing information in an indexed computer data structure may include a lookup procedure, an insertion procedure, a removal and replacement procedure, and a release procedure. Each of these procedures accesses entries in an indexed computer data structure, such as a hash table, to access and store information. Each entry in the indexed computer data structure may include an in-use counter to indicate when the entry is in use by one or more threads. The in-use counter permits multiple threads or processes to concurrently access an entry without locks.

11 Claims, 12 Drawing Sheets

OTHER PUBLICATIONS

Nelson, Mark, *The Data Compression Book*, Chapter 11 "Lossy Graphics Compression", M&T Books, 1992 pp. 347–374.

Pennebaker, William B. and Mitchell, Joan, *JPEG Still Image Data Compression Standard*, Chapter 5 Image Compression Systems, Chapter 6 "JPEG Modes of Operation", and Chapter 7 "JPEG Syntax and Data Organization", Van Nostrand Reinhold, 1993, pp. 65–134.

Ryan et al., "SCI for Local Area Networks," Research Report 256, University of Oslo, Norway, pp. 1–18, Jan. 1998.

Ian Alexander Prat, "The User–Safe Device I/O Architecture," Dissertation, King's College, University of Cambridge, pp. 1–158, Aug. 1997.

Welsh et al., "Incorporating Memory Management into User–Level Network Interfaces," Department of Computer Science, Cornell University, 1997.

Chen et al., "UTLB: A Mechanism for Address Translation on Network Interfaces," published in "Proceedings of the Eighth International Conference on Architectural Support for Programming Languages and Operating Systems" (APLOS VIII), vol. 33, No. 11, pp. 193–204, Nov. 1998.

"Windows* Sockets 2 Service Provider Interface," Revision 2.0.8, pp. 1–157, Jun. 30, 1995.

Li et al., "High–Performance Distributed Objects over a System Area Network," pp. 1–14, Dec. 14, 1998.

"Virtual Interface Architecture Specification," Draft Revision 1.0, pp. 1–83, Dec. 4, 1997.

Goodman et al., "Memory Systems," *The Electrical Engineering Handbook*, CRC Press, pp. 1927–1936, 1993.

Larson et al., "LKRhash: Scalable Hash Tables," pp. 1–15, Draft Nov. 19, 1998.

* cited by examiner

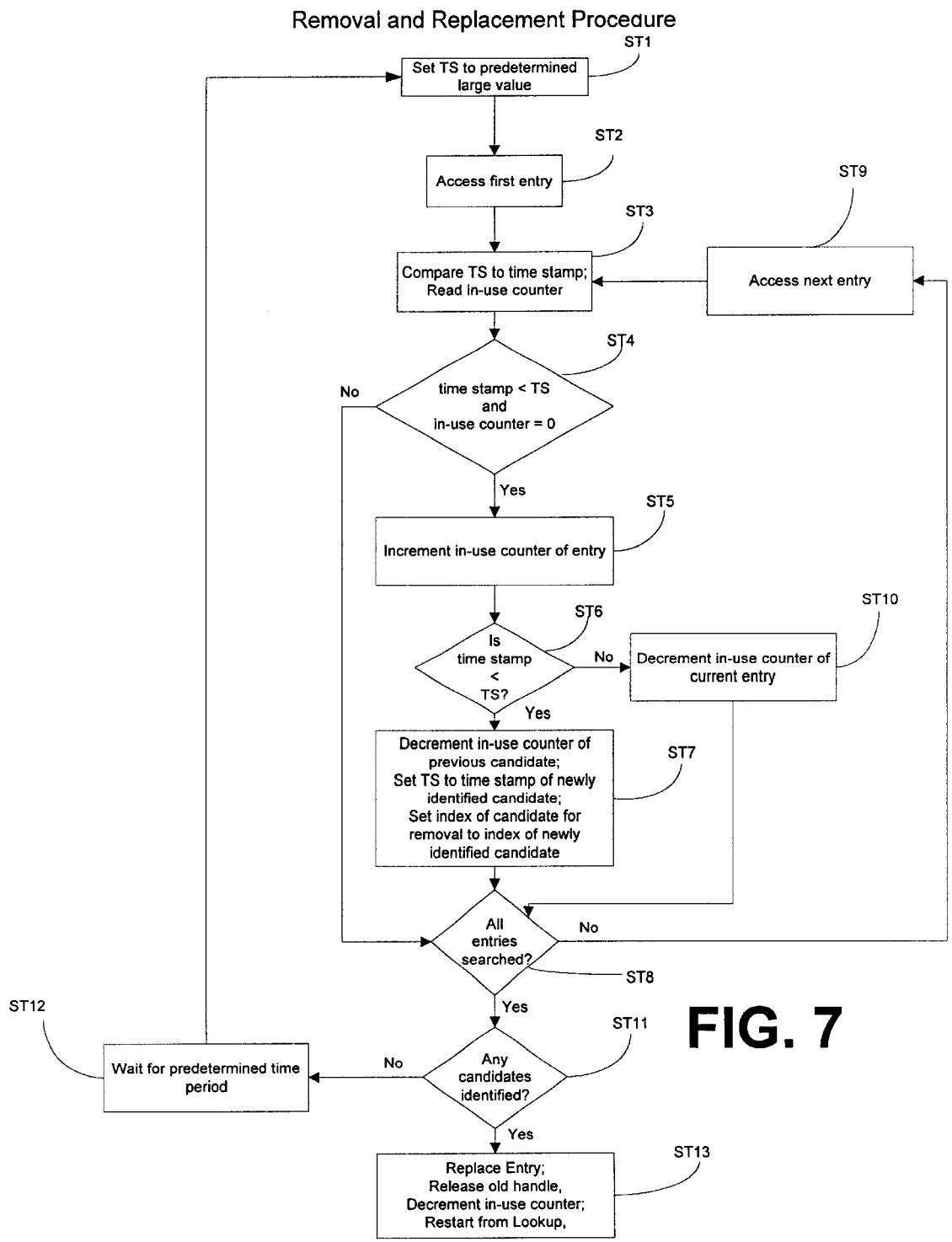

LOCK-FREE METHODS AND SYSTEMS FOR ACCESSING AND STORING INFORMATION IN AN INDEXED COMPUTER DATA STRUCTURE HAVING MODIFIABLE ENTRIES

This application claims the benefit of U.S. Provisional Patent Application No. 60/095,297, filed Aug. 4, 1998, the disclosure of which is incorporated herein by reference in its entirety.

TECHNICAL FIELD

The present invention relates to methods and systems for accessing and storing information in an indexed computer data structure. More particularly, the present invention relates to lock-free methods and systems for accessing and storing information in an indexed computer data structure having modifiable entries.

BACKGROUND OF THE INVENTION

In computer programs, such as cache memory management systems, it is desirable to decrease the retrieval time of frequently accessed information. In order to decrease the retrieval time of frequently accessed information, cache memory systems may store the frequently accessed information in an indexed data structure, such as a hash table. As used herein, the phrase "indexed computer data structure" or "indexed data structure" refers to a set of elements referred to as entries, wherein each and every entry is uniquely selectable based on a selection function that produces an index. A hash table is an indexed data structure that may be stored in computer memory to reduce the number of comparisons required to locate and retrieve information. For example, a hash table may comprise an array of records or entries containing the information desired to be located. Each entry may also contain a key used by processes or threads performing lookup or search algorithms to locate the entry. A key is a unit of data that is compared with a search key to determine whether an entry contains the data of interest. A hash table reduces the number of keys that must be compared to locate a given entry using a hash function. A hash function is a mathematical algorithm that receives a key as an input and ideally computes a unique index as an output. For example, the hash function may always produce the same index for a given key. However, different keys may result in the same index, if the hash function is not perfect. If the hash table is stored in an array, the index may represent an offset from the table base address and a potential location for the entry containing a key that matches the search key. Thus, for a given entry e in the table with key k, INDEX=hash(k). If the table including the entry e is an array, e and the key k may be stored at array[INDEX].

Because hashing different keys may result in the same index, an entry may not be located at the index corresponding to the hash of the key for the entry. For example, when different keys hash to the same index, the first key may be stored at the location corresponding to hash(key). The second key may be stored at another location, e.g., a location corresponding to hash(key)+1. Thus, even though hashing reduces the number of comparisons required to locate an entry, more than one comparison may be required. For example, in order to locate an entry in a hash table, a thread may first hash a search key to determine an initial index. The thread then locates the entry corresponding to the index and compares the key in the entry with the search key. If the keys match, the thread may extract the desired information or a pointer to the desired information from the entry. If the keys do not match, the thread may search the remaining entries in the table to locate a matching key. In certain cases the hash table may be constructed or used in such a way as to eliminate the potential for duplicate hash results, i.e., as in the case of perfect hash functions. In such a case, only a single comparison may be required to locate an entry because each entry is stored exactly at the location corresponding to the hash of the key value for the entry.

If the hash table is stored in a fast memory device and used to cache data stored in another slower memory device, when a thread fails to locate an entry having a matching key in the hash table, the thread may extract the data from the slower memory device and attempt to insert the data into the hash table. Inserting the data in the hash table may include attempting to store the data at the location corresponding to the hash of the search key. If the entry at that location is uninitialized, i.e., if it has not been previously used to store information, the thread may insert the data in the entry. If the entry has been initialized, the thread may search for an empty entry in the table to store the new data. If the table is full, the thread may replace an existing entry with the new data. Once the new data is stored in the hash table, subsequent searches of the hash table for the entry will succeed, unless another process removes the new entry.

A problem with conventional methods for accessing and storing data in hash tables and other data structures used in cache memory systems is that these methods may require locking when multiple threads or multiple processes access a data structure to ensure the validity of information retrieved during a search. For example, in one conventional cache memory system, when a first thread accesses a cache, for example to perform a lookup operation, the first thread locks the cache, preventing other threads from performing any cache operations. When the first thread completes the search operation, the first thread unlocks the cache, allowing other threads to access the cache. Allowing a single thread to block all other attempted accesses to a cache is undesirable because the first thread may block during its access to the cache and prevent other threads from accessing the cache indefinitely. Even if the first thread does not fail or block, the remaining threads are delayed for at least the time for the first thread to lock the cache, perform the lookup operation, and unlock the cache. These operations introduce latency into cache accesses by the other threads. Thus, allowing a single thread to lock the entire cache may be undesirable in high-speed computer memory systems whenever there is likely to be contention among multiple threads for accesses to the cache.

In another conventional memory system, rather than locking an entire cache, a thread may lock each individual cache entry when the thread accesses the entry and unlock the entry when the thread completes the access to the entry. For example, in a lookup operation, a thread may search through entries or records in a table. In order to access each entry, the thread locks the entry, reads the information in the entry, determines whether the information matches the search key, and unlocks the entry. This process is repeated for each entry in the table until a match is found. Other threads may be prevented from accessing the entry due to the lock. Because the first thread locks, reads, compares, and unlocks each entry before another thread can access the entry, latency may be introduced into cache operations performed by other threads. In addition, locking and unlocking each entry during a search may introduce latency into memory operations performed by the first thread. Thus, a cache memory system that requires locking and unlocking of entries by each thread may be unsuitable for high-speed operations.

SUMMARY OF THE INVENTION

As described above, the phrase "indexed computer data structure" refers to a set of elements referred to as entries, wherein each entry is uniquely selectable utilizing a selection function that produces an index. The selection function may comprise any mathematical function that maps data from a first domain into a second domain, wherein the second domain is a set of indices capable of selecting all of the entries. Exemplary indexed computer data structures to which the lock-free methods and systems according to the present invention may apply include hash tables and linked lists. A hash table may be indexed using a perfect or an imperfect hash function. The lock-free methods and systems for accessing an indexed computer data structure are applicable to hash tables accessible by both perfect and imperfect hash functions. A linked list may be indexed by computing an index to a first entry in the list and following pointers to locate the data of interest. The lock free methods and systems for accessing an indexed computer data structure according to the present invention may be used to access entries stored in a linked list utilizing any selection function to compute the initial index.

The present invention is not limited to methods and systems for accessing and storing information in a hash table or a linked list. For example, the lock-free methods and systems are applicable to any indexed computer data structure, such as a simple array. In such a case, the search key may be the offset from the table base address and the selection function may utilize the search key to directly access an entry.

The lock-free methods and systems for accessing and storing information in an indexed computer data structure according to the present invention may be used by any form of concurrent execution or apparently concurrent execution provided by a computer operating system to access and store entries without requiring locks. For example, in operating systems that allow concurrent threads of execution on multiple processors in a shared memory multiprocessor, the lock-free methods and systems for accessing and storing information may be used by multiple threads to concurrently access and store entries in the indexed computer data structure. In an operating system that allows multiple processes, the lock-free methods and systems for accessing and storing information according to the present invention may be used by multiple processes to concurrently access and store information. In an operating system that allows both multiple threads and multiple processes, the lock-free methods and systems for accessing and storing information according to the present invention may be used by multiple threads and multiple processes to concurrently access information. Thus, while the discussion that follows may refer to concurrent access by threads or processes, the lock-free methods and systems according to the present invention are applicable to any form of concurrent execution, regardless of whether the concurrent execution is real or simulated.

According to a first aspect, the present invention includes a method for locating entries in an indexed computer data structure. The method may include executing a first thread for performing a lookup for a first entry in an indexed computer data structure, locating the first entry, and accessing the information stored in the first entry. While the first thread accesses the information in the first entry, the method may include allowing a second thread to concurrently access the information in the first entry. Allowing concurrent access to information in an entry greatly increases the efficiency of concurrent lookup operations.

According to another aspect, the present invention may include a lookup procedure including computer-executable instructions for allowing concurrent access to entries in an indexed computer data structure. The instructions may include starting a first thread for performing a lookup for a first entry in an indexed computer data structure and locating the first entry. After starting the first thread, a second thread may be allowed to concurrently access the first entry.

According to another aspect, the present invention may include a computer data structure for a concurrently accessible entry in an indexed computer data structure. The computer data structure for the entry may include at least one key value field for storing at least one key value for comparison with a search key to identify the entry. The data structure for the entry may also include a data field for storing data or a pointer to the data to be extracted from the entry. The data structure may further include an in-use counter field for storing an in-use counter for indicating whether the entry is in use.

According to another aspect, the present invention may include an insertion procedure for inserting entries in an indexed computer data structure. The insertion procedure may include computer-executable instructions embodied in a computer-readable medium for performing steps. The steps may include obtaining data to be inserted into an indexed computer data structure from a source external to the indexed computer data structure. After obtaining the data, the insertion procedure may access a first entry to insert the data while allowing other threads to access to the first entry. The insertion procedure may then determine whether the first entry is empty. If the first entry is empty, the insertion procedure may increment an in-use counter associated with the first entry. After incrementing the in-use counter, the insertion procedure may determine whether the first entry remains empty. In response to determining that the first entry remains empty, the insertion procedure may write the data obtained from the external source in the first entry.

According to another aspect, the present invention may include a removal and replacement procedure for removing and replacing entries in an indexed computer data structure. The removal and replacement procedure may include computer-executable instructions embodied in a computer-readable medium for performing steps. The steps may include accessing a first entry in an indexed computer data structure, reading an in-use counter associated with the first entry, and determining whether the first entry is a candidate for removal. The first entry may be identified as a candidate for removal based on any suitable removal condition or conditions. For example, exemplary removal conditions or criteria include the time of last use of the entry, random or pseudo-random selection algorithms, or a roving index that is incremented after each removal. However, even if the removal condition is satisfied for an entry, the entry may not be considered as a candidate for removal until the in-use counter indicates that no threads are using the entry. Once the removal and replacement procedure determines that the predetermined removal condition is satisfied and that no threads are using the entry, the removal and replacement procedure may increment the in-use counter of the entry and re-check whether the predetermined removal condition remains satisfied. If the condition remains satisfied, the entry may be identified as a candidate for removal. The removal and replacement procedure may repeat the testing for each entry in the indexed computer data structure until the best candidate for removal is identified. When the best candidate is identified, the removal and replacement procedure may write new values to the fields in the entry.

In one implementation of the invention, a least recently used policy is used to identify candidates for removal. In this implementation, the removal and replacement procedure may compare a time stamp value of the first entry with a predetermined time stamp value. The removal and replacement procedure may identify the first entry as a candidate for removal if the in-use counter indicates that the first entry is not in use and the time stamp value of the entry is less than the predetermined time stamp value.

According to another aspect, the present invention may include a virtual interface user agent comprising computer-executable instructions embodied in a computer-readable medium. The computer executable instructions may include receiving a request for performing an operation for receiving data into or sending data from a memory location specified by a virtual memory address. The request may include a virtual memory address. In response to the request, the virtual interface user agent may perform a lookup procedure in an indexed computer data structure to locate a memory handle corresponding to the virtual memory address. The virtual interface user agent may locate the entry containing the memory handle and access the entry. While the virtual interface user agent accesses the entry, the virtual interface user agent may allow other threads to access the entry.

According to another aspect, the present invention includes a computer program including computer-executable instructions embodied in a computer-readable medium for coalescing entries in an indexed computer data structure. The computer executable instructions instruct a computer to perform steps. The steps include searching an indexed computer data structure for a first entry having one or more key values having a first relationship with a search key. In response to failing to locate the first entry, the computer instructions may include identifying at least one second entry in the indexed computer data structure having a second relationship with the search key and incrementing an in-use counter associated with the second entry. After incrementing the in-use counter, the instructions may include determining whether the second relationship between the second entry and the search key still exists. In response to determining that the second relationship still exists, the instructions may include coalescing the second entry with data corresponding to the search key.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages may be best understood from the following detailed description taken in conjunction with the accompanying drawings of which:

FIG. 7 is a flow chart illustrating exemplary steps that may be performed by a removal and replacement procedure for removing and replacing entries in an indexed computer data structure according to an embodiment of the present invention;

SPECIFIC DESCRIPTION OF THE INVENTION

Figure 1:
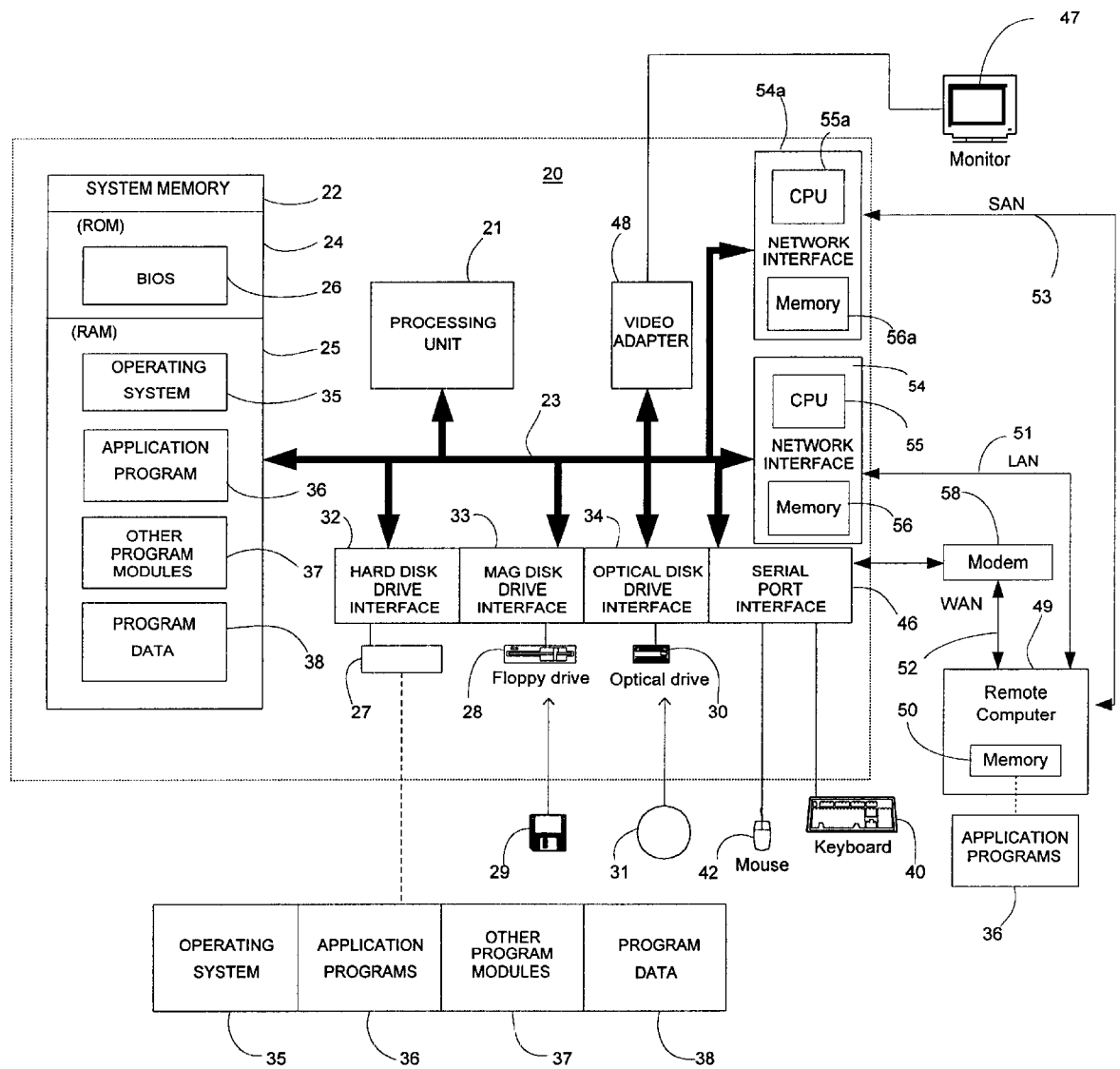
FIG. 1 is a block diagram generally illustrating an exemplary computer system on which embodiments of the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. The operating system 35 may include a virtual memory manager and one or more I/O device drivers that communicate with each other to maintain coherence between virtual memory address mapping information stored by the operating system 35 and virtual memory mapping information stored by one or more I/O devices, such as network interface adapters 54 and 54a. A user may enter commands and information into the personal computer 20 through input devices such as a keyboard 40 and a pointing device 42. Other input devices (not shown) may include a microphone, touch panel, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet.

System area networking environments are used to interconnect nodes within a distributed computing system, such as a cluster. For example, in the illustrated embodiment, the personal computer 20 may comprise a first node in a cluster and the remote computer 49 may comprise a second node in the cluster. In such an environment, it is preferable that the personal computer 20 and the remote computer 49 be under a common administrative domain. Thus, although the computer 49 is labeled "remote", the computer 49 may be in close physical proximity to the personal computer 20.

When used in a LAN or SAN networking environment, the personal computer 20 is connected to the local network 51 or system network 53 through the network interface adapters 54 and 54a. The network interface adapters 54 and 54a may include processing units 55 and 55a and one or more memory units 56 and 56a. The memory units 56 and 56a may contain computer-executable instructions for processing I/O requests including translating virtual memory addresses to physical memory addresses, obtaining virtual address mapping information from the operating system 35, and recovering from local address translation failures. The memory units 56 and 56a may also contain page tables used to perform local virtual to physical address translations.

When used in a WAN networking environment, the personal computer 20 typically includes a modem 58 or other means for establishing communications over the WAN 52. The modem 58, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The lock-free methods and systems for accessing and storing information in an indexed computer data structure may be used by any of the program modules 35–37 illustrated in FIG. 1 to access and store information in any of the memory devices 24, 25, 27, 29, 31, 56 or 56a. The lock-free methods and systems are particularly well suited for cache memory systems where it is desirable for multiple threads to concurrently access information stored in a fast memory device. For example, the system memory 22 may include a copy of frequently accessed information from a storage device. The information may be arranged in a hash table, and the lock-free methods and systems for accessing the information may be used by any of the program modules to concurrently access the information in the table. In an alternative embodiment, in processing circuits where programs have control over on-chip memory caches, such as the TriMedia DSP available from Philips Semiconductor Corporation or the Alteon Tigon dual processor chip, the lock-free methods and systems of the present invention may be used to control concurrent access to the on-chip cache by multiple threads.

In yet another alternative embodiment, the lock-free methods and systems for accessing an indexed computer data structure may be used to control access to information generated internally by a program, such as memory handles stored in a hash table. Memory handles are data structures that allow I/O devices, such as network interface adapters 54 and 54a direct access to application-level buffers when sending or receiving data over a network. However, memory handles are not limited to use with network I/O devices. For example, memory handles may be used by any I/O device to translate virtual memory addresses to physical memory addresses. Additional I/O devices that may utilize memory handles include audio devices, video devices, and storage devices.

In some I/O architectures, such as the Virtual Interface Architecture (VIA), applications may request I/O operations, such as the sending of data, from an I/O device. The requests may include the virtual memory address of the data to be sent. In order to communicate an I/O request to an I/O device, a user application may execute an I/O operation, such as a "Winsock" send( ) operation to request the sending of data located at a virtual memory address. The "Winsock" provider software may convert the request into a descriptor specifying the virtual address of the send buffer and the length of the send buffer. The provider software may post the descriptor in a send queue associated with the I/O device and ring a doorbell associated with the send queue to notify the device that a new I/O request has been placed in the send queue. Ringing the doorbell may include writing a doorbell token containing a pointer to the descriptor to a doorbell register associated with the I/O device. The I/O device processes the descriptors posted in the receive queue and performs the requested I/O operations.

According to some versions of the VIA, the I/O device may require that a virtual memory region containing the data to be sent be registered with the I/O device before performing the I/O operations. Memory registration may include sending a memory registration request to an I/O device driver and obtaining a memory handle used to qualify the memory region to the I/O device. A thread requesting an I/O operation may provide the memory handle to the I/O device. For example, the memory handle may be included in the descriptor posted in the send queue. The memory handle may be used by the I/O device to translate the virtual memory address of data to be sent to a physical memory address.

Because registering memory regions with an I/O device may be processor-intensive, it may be desirable to cache memory handles for previously registered memory regions in a hash table so that I/O threads seeking to register memory regions can quickly access the cached memory handles. The lock-free methods and systems for accessing and storing information according to the present invention may be used by multiple threads performing I/O operations to retrieve memory handles for previously registered memory regions.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the acts and operations described hereinafter may also be implemented in hardware.

Figure 2:
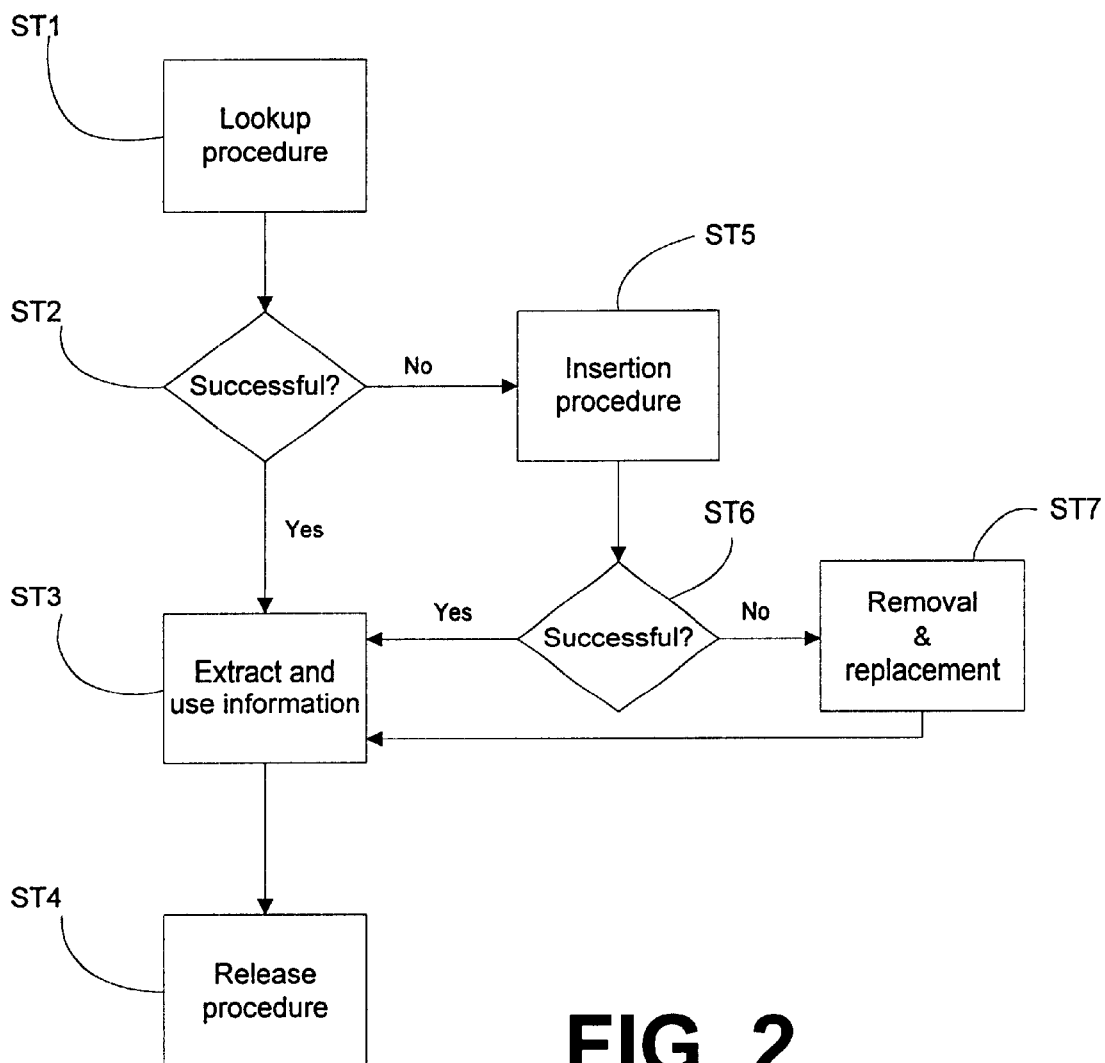
FIG. 2 is a flow chart illustrating an exemplary relationship between a lookup procedure, an insertion procedure, a removal and replacement procedure, and a release procedure according to an embodiment of the present invention.

In order to access information in an indexed computer data structure, such as a hash table, embodiments of the present invention may include a lookup procedure, an insertion procedure, a removal and replacement procedure, and a release procedure. FIG. 2 is a flow chart illustrating an exemplary relationship between the lookup procedure (step ST1), the release procedure (step ST4), the insertion procedure (step ST5), and the removal and replacement procedure (step ST7). Each of these procedures may comprise computer-executable instructions embodied in a computer-readable medium for implementing the lock-free methods and systems for accessing information in an indexed data structure according to embodiments of the present invention. For example, the lookup procedure (step ST1) may comprise computer-executable instructions for performing a lookup operation for a key value stored in an indexed computer data structure. If the lookup procedure is successful, the thread or other form of concurrent execution requesting the lookup extracts and uses the information. (Step ST3) While the thread is using the data in the entry, the thread preferable notifies other threads that the entry is in use. However, unlike conventional lookup algorithms, the lookup procedure does not prevent other threads from accessing the entry while the entry is in-use by the first thread. After using the information, the first thread calls a release procedure (step ST4) to indicate to other procedures that the entry is no longer in use by the first thread. The mechanism for indicating whether an entry is in use will be discussed in more detail below.

If the lookup is not successful in locating an entry, the insertion procedure may be called (step ST5) to obtain the information from a source external to the data structure and insert the information into an entry for future use. If the insertion is successful, the thread invoking the insertion procedure may extract and use the information and then release the entry. If the insertion is not successful, the removal and replacement procedure (step ST7) may be called to remove an unused entry and replace the unused entry with the new entry. After replacing the old entry in the data structure, the thread may extract and use the information and then call the release procedure to release the entry.

According to an important aspect of the invention, a plurality of threads or processes may invoke the procedures illustrated in FIG. 2 to concurrently access entries in an indexed computer data structure. In order to coordinate concurrent access, each entry in the data structure may include an in-use counter. The in-use counter indicates the number of threads that are using a given entry. For example, when a first thread locates and uses an entry, the first thread may atomically increment the in-use counter associated with the entry to notify other threads that the data in this particular entry is being used. The incrementing operation is preferably atomic, in the sense that if more than one thread simultaneously accesses the entry and increments the in-use counter, the in-use counter preferably increases by more than one unit. Other threads may still access the entry; however, the other threads preferably modify their behavior based on the value of the in-use counter. For example, if a first thread marks an entry in-use, other threads may be prevented from removing or replacing the data in the entry. However, non-interfering uses, such as concurrent lookups that access the same entry may occur without modification. Since lookup operations may be the most frequently occurring operations in a cache memory system, the methods and systems for accessing information in an indexed computer data structure according to the present invention may greatly improve performance over conventional methods. When the first thread completes use of an entry, the first thread may atomically decrement the in-use counter of the entry. The decrementing operation is preferably atomic in the sense that if more than one thread simultaneously decrements the in-use counter, the in-use counter decreases by more than one unit. However, the in-use counter preferably has a minimum value, e.g., zero, to indicate that the entry is not in use. Accordingly, the in-use counter preferably does not decrease below the minimum value.

Both the atomic increment and atomic decrement operations may be implemented in the instruction set of the CPU of the computer on which the lock-free methods and systems according to the present invention execute. For example, in x86 processors available from Intel Corporation, the atomic increment and atomic decrement operations may be implemented utilizing the "lock inc" and "lock dec" instructions, respectively. In RISC processors, such as a MIPS processor, the atomic increment and decrement operations may be implemented as follows.

1) LoadLinked<address of in-use counter>=>Register1
2) Increment (Decrement) Register1
3) StoreConditional Register1=><address of in-use counter>
4) If StoreConditionalFailed retry from start In line 1, the current value of the in-use counter of an entry is stored in a register of the processor. In line 2, the value in the register is incremented or decremented depending on whether an atomic increment or an atomic decrement operation is being executed. In line 3, the modified in-use counter value from the register is conditionally written to the memory location of the in-use counter of the entry. The write operation is conditional on whether the in-use counter of the entry has been accessed by another thread since step 1. If another access has not occurred, the value of the in-use counter is updated. If another access has occurred, in line 4, the procedure restarts from line 1. The procedure may be repeated until the operation completes successfully. In this manner, the use-counter may be atomically incremented or decremented. However, the present invention is not limited to the methods described above for atomically incrementing or atomically decrementing the in-use counter of an entry. Any operation that serializes concurrent increment or decrement operations is within the scope of the invention. As used hereinafter, the terms "increment" and "decrement", when describing operations performed on the in-use counter, are intended to refer to atomic operations.

Figure 3:
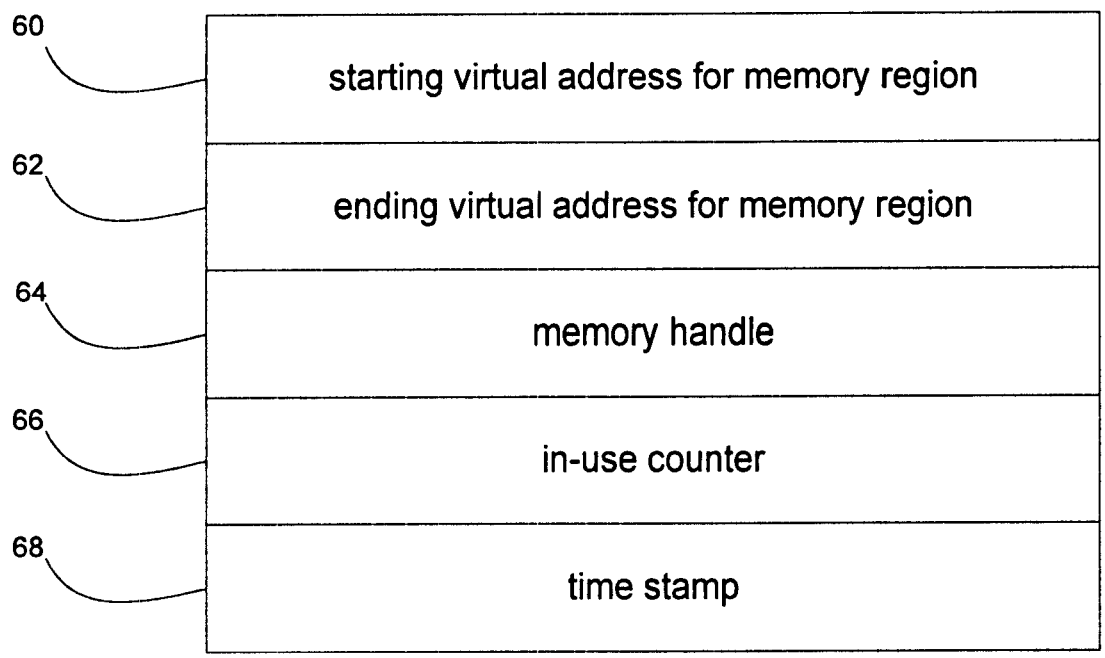
FIG. 3 is a block diagram illustrating exemplary fields which may be included in an entry of an indexed computer data structure according to an embodiment of the present invention.

Although the procedures illustrated in FIG. 2 may be used for accessing and storing any type of information in any indexed computer data structure, the procedures will be explained in the context of a memory registration cache that utilizes a hash table for storing memory handles used by I/O devices to translate virtual memory addresses to physical memory addresses. FIG. 3 illustrates exemplary fields that may be included in an entry of the hash table of a memory registration cache. The entry may include a starting virtual address field 60 and an ending virtual address field 62 for storing starting and ending virtual memory addresses for a registered memory region. For example, for a four kilobyte memory region beginning at address zero and ending at address 4096, the starting virtual address field 60 may include the address zero and the ending virtual address field 62 may include the address 4096. The starting and ending virtual address fields 60 and 62 may be used as the key values to be compared with the search key according to the present embodiment. For example, when a process invokes the lookup procedure to search for a memory handle, the process may use the virtual memory address of data to be sent in an I/O operation as a search key. When the process analyzes an entry to determine whether a match occurs, the process compares the search key to the starting and ending virtual memory addresses. If the search key, i.e., the virtual memory address, is within the range defined by the starting and ending virtual memory addresses, a match is indicated.

The present invention is not limited to a hash table with fields for storing starting and ending virtual memory addresses as keys to identify the entry. For example, in an alternative embodiment, the entry may include a single key field containing a key used to identify the entry. The key may be any data for identifying the entry. For example, if the hash table is used to store entries containing information regarding parts sold by a company, the key may be the part number. A thread searching for the entry may compare a search key to the key stored in the key field of the entry to locate information about a given part.

The entry illustrated in FIG. 3 may also include a memory handle field 64 for storing a memory handle of a registered memory region. In this example, the memory handle is the information desired to be extracted from the hash table. When a thread requests an I/O operation, the thread provides the memory handle along with the virtual memory address of data to be sent to an I/O device. Because the time for retrieving a memory handle from a hash table may be less than the time required to register memory with a device driver to obtain a memory handle, storing the memory handle in a hash table decreases latency in I/O operations. However, the present invention is not limited to using a hash table to store memory handles. For example, the field 64 may be used to store any information for which rapid access by concurrent threads is desired, or a pointer to such information if it is undesirable or impossible to copy the information.

According to an important aspect of the invention, the entry includes an in-use counter field 66 for storing the in-use counter value for the entry. The in-use counter is used by threads to mark an entry in use. In a preferred embodiment, the in-use counter is an integer indicating the number of threads or processes concurrently using an entry. If the in-use counter is zero, the entry is not in use. If the in-use counter is not zero, the entry is in use. For example, an in-use counter value of four may indicate that four threads are currently using an entry.

In embodiments of the invention that utilize a time-based condition to identify candidates for removal, the entry may also include a time stamp field 68 for storing a time stamp value. The time stamp value may be indicative of the last time an entry was accessed by a thread. The time stamp value may comprise an integer indicative of the time in any units, such as nanoseconds, relative to an epoch, indicating the time of last access to an entry. In an alternative embodiment, the time may comprise the value of a counter associated with the hash table when the last access to the entry occurred. The time stamp may be used by the removal and replacement procedure to identify candidates for removal. In embodiments of the invention in which candidates for removal are not identified on time-based conditions, the time stamp field may be omitted.

Figure 4:
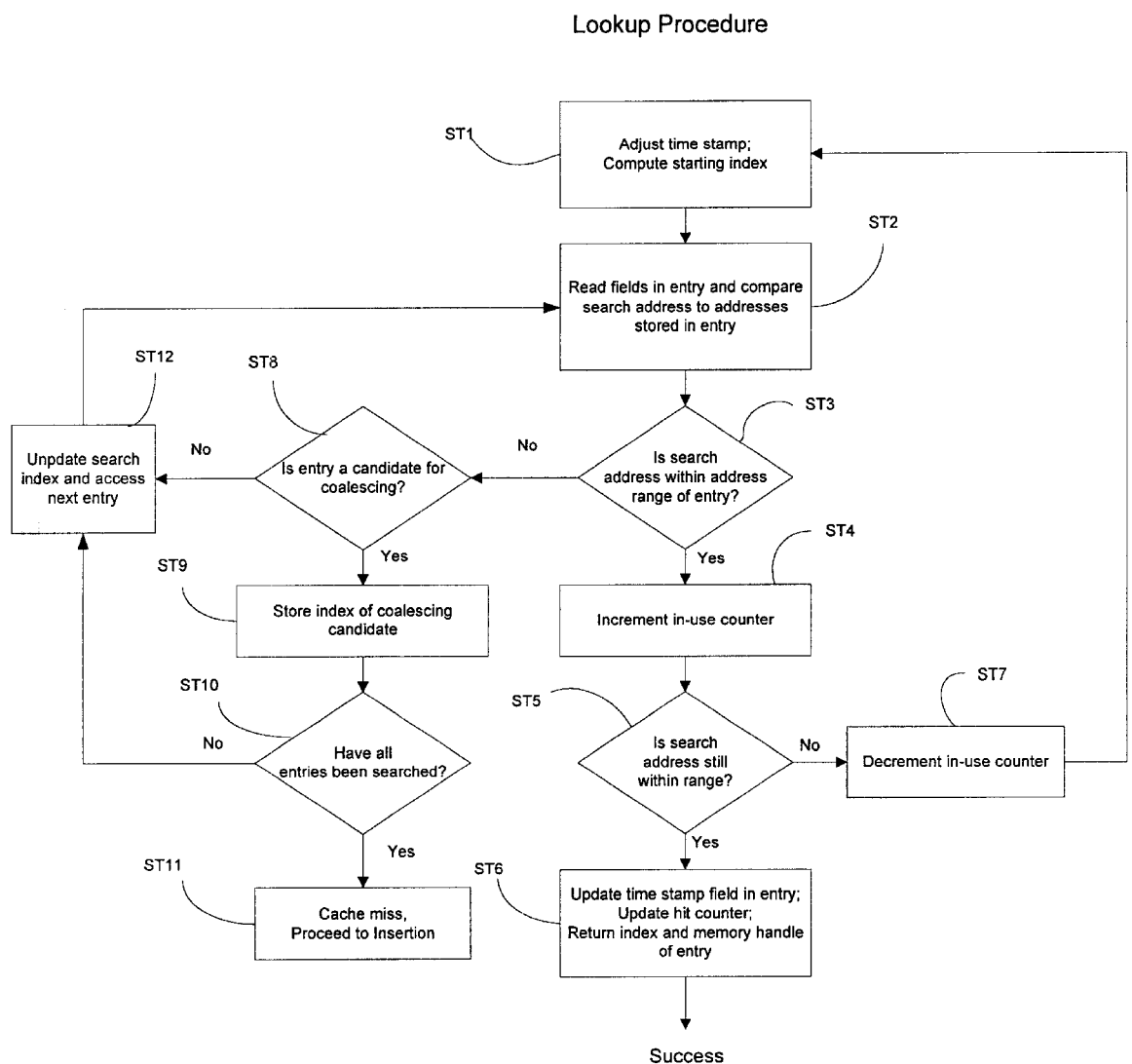
FIG. 4 is a flow chart illustrating exemplary steps that may be performed by a lookup procedure for locating information stored in an indexed computer data structure according to an embodiment of the present invention.

FIG. 4 is a flow chart illustrating exemplary computer-executable instructions that may be included in the lookup procedure of FIG. 2. The lookup procedure illustrated in FIG. 4 includes computer-executable instructions for locating entries, such as the entries illustrated in FIG. 3, stored in a hash table. However, the present invention is not limited to methods and systems for locating information stored in a hash table. The lookup procedure according to the present invention may be used to access any indexed computer data structure. For example, the lookup procedure may be used to locate entries in a linked list or a simple array. However, because a hash table is an efficient structure for storing information, using a hash table is preferred.

In step ST1, the lookup procedure may adjust a time stamp and compute a starting index to begin searching. The time stamp may be a variable local to the lookup procedure used to store a time value. The time value may be obtained by reading the value of a system counter at the initiation of the lookup procedure. The value of the time stamp variable may be copied into the time stamp field of an entry when the lookup procedure successfully locates an entry. The removal and replacement procedure may utilize the time stamp value of each entry to identify candidates for removal, e.g., by identifying a least-recently-used candidate, when the table is full. However, as stated above, candidates for removal may be identified based on other criteria, such as a random value or a roving index, that are unrelated to time. Accordingly, if candidates for removal are not identified based on time-related criteria, adjusting the time stamp may be omitted from step ST1.

In order to compute the starting index, the lookup procedure may hash the search key. In this example, since the search key is a virtual memory address value used in an I/O operation, the starting index is set to a hash of the virtual memory address. The starting index may be used to locate the initial entry in the table for comparison with the virtual address being searched. However, because the hash function may not produce a unique index for each virtual memory address value, the starting index may not contain the entry corresponding to the virtual address. Accordingly, it may be necessary to search more than one table entry to locate the memory handle for the virtual memory address.

In step ST2, the lookup procedure reads the data in the table entry located at the starting index and compares the search address to the starting and ending address values stored in the starting and ending virtual address fields of the entry. According to an important aspect of the invention, if the lookup procedure determines that the search address is within the range defined by the starting and ending address fields, the lookup procedure increments the in-use counter associated with the entry. (steps ST3 and ST4) Incrementing the in-use counter notifies other threads that access the entry that the entry is in use. The insertion procedure and the removal and replacement procedure are structured so that an entry is preferably not modified or replaced while in use by a first thread. However, unlike a conventional lock, the in-use counter allows threads executing lookup, insertion, or removal procedures to access an entry while the entry is being used by another thread.

After incrementing the in-use counter to mark the entry in use, the lookup procedure rechecks the addresses to verify that the search address is still within the range defined by the starting and ending addresses. (step ST5) This rechecking prevents an error from occurring if another thread modifies or removes the entry between the first comparison and the incrementing of the in-use counter, i.e., between steps ST3 and ST4. If the address remains within the range, the lookup procedure determines that a cache hit has occurred and returns the index of the cache entry and the information being sought, which in this example, is the memory handle associated with the memory region. (step ST6).

In some embodiments of the invention, the lock-free methods and systems for accessing an indexed computer data structure may monitor the performance of the cache. The performance may be based on the percentage of cache hits relative to the total number of cache accesses. Accordingly, in step ST6, when the lookup procedure determines that a cache hit has occurred, the lookup procedure may also update a hit associated with the cache. However, because monitoring cache performance is an optional feature of the invention, in an alternative embodiment, updating the hit counter associated with the cache may be omitted from step ST6.

In addition, if the removal and replacement procedure utilizes a time-based condition for identifying candidates for removal, in step ST6, the lookup procedure may also update the time stamp associated with the entry to indicate the time of last use. Alternatively, if the removal and replacement procedure utilizes a removal condition that is not time-based, the entry may not include a time stamp value, and updating the time stamp of the entry may be omitted from step ST6.

The lookup procedure preferably does not decrement the in-use counter after a hit has occurred because the thread executing the lookup procedure may still be using the entry after the entry is located. Decrementing the in-use counter could allow another thread executing the removal and replacement procedure or the insertion procedure to modify the memory handle of an entry while the memory handle is being used by the thread that executed the lookup procedure. Accordingly, the release procedure may be called after a thread completes use of the memory handle for an entry to decrement the in-use counter.

In step ST7, if the second comparison of the address to the starting and ending virtual addresses of the entry indicates that the address is no longer in range, the lookup procedure preferably decrements the in-use counter. For example, if the second comparison indicates that the virtual address is no longer within the range of the addresses in the entry, another thread may have executed an insertion or a removal between steps ST3 and ST4 of the lookup procedure. When this occurs, since the entry no longer includes the data of interest, the thread executing the lookup procedure preferably decrements the in-use counter and restarts the lookup procedure.

According to another aspect of the invention, the lookup procedure may identify entries that are candidates for coalescing with the memory region containing the virtual address for which the lookup is being performed. Coalescing is an optional feature of the invention that may be utilized to reduce the number of table entries, when data in the entries is logically combinable. In the present example, the entries contain virtual memory address ranges that may be logically combinable with the memory region containing the search address. Thus, the lookup procedure may identify coalescing candidates. Another example in which entries contain data that is logically combinable is where entries store a single number or a range of numbers. For example, a table may include two entries. The first entry may store the number two and the second entry may store a range of numbers from four to six. If the insertion procedure attempts to insert the number three into the table, the first and second entries may be identified as candidates for coalescing because the data in the first and second entries is logically adjacent to the number three. The present invention is not limited to a lookup procedure that identifies candidates for coalescing. For example, in an alternative embodiment of the invention, steps for identifying candidates for coalescing may be omitted from the lookup procedure.

In the embodiment illustrated in FIG. 4, the lookup procedure includes steps for identifying candidates for coalescing. Since the entries in the present example store virtual memory address ranges, candidates for coalescing may be identified based on whether the virtual memory address ranges of the entries are contiguous with a virtual memory page containing the search address. For example, when an application requests an I/O operation, the request may include a virtual memory address of a send buffer or a receive buffer and the size of the buffer. The communications provider software that receives the I/O request may identify the virtual memory page that contains the buffer. If the page is contiguous with any of the memory regions stored in the hash table, the entries containing the contiguous memory regions are preferably identified as candidates for coalescing with the region for which registration is sought. Coalescing table entries reduces the number of entries in the table and therefore increases the efficiency of subsequent lookup operations.

Figure 5A:
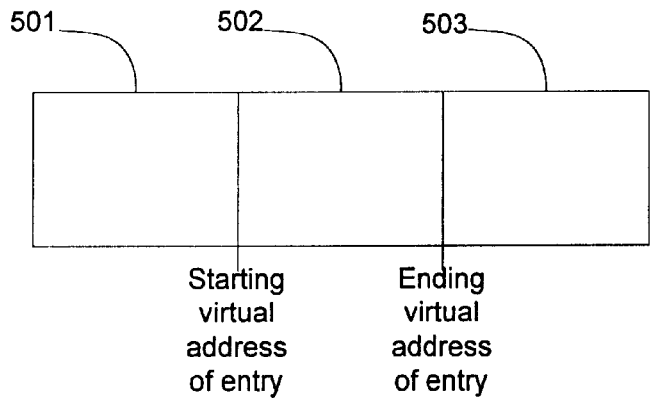
FIGS. 5(a)–5(c) are block diagrams illustrating a virtual memory region of a hash table entry and left and right candidates for coalescing with the memory region.
Figure 5B:
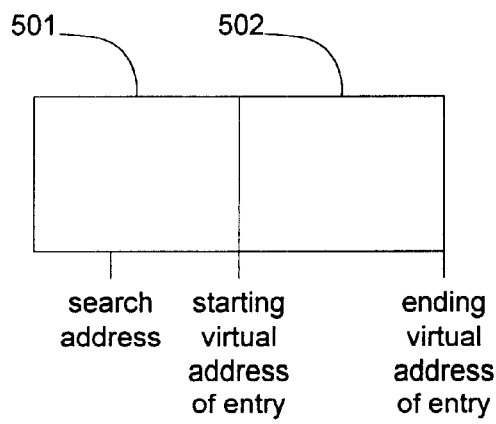
Figure 5C:
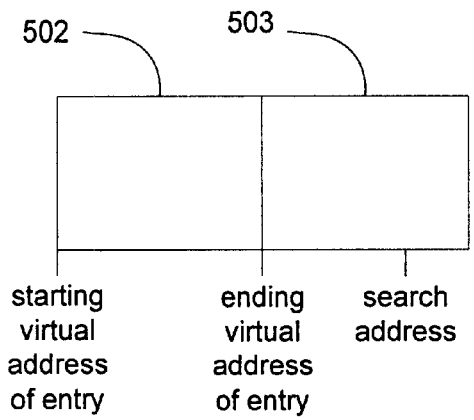

FIGS. 5(a)–5(c) are block diagrams illustrating an example of how candidates for coalescing may be identified. In FIG. 5(a), the center block represents a registered virtual memory region 502 corresponding to a table entry. Virtual memory region 502 has a starting address equal to the starting virtual address in the table entry and an ending virtual address equal to the ending virtual address in the table entry. Virtual memory pages 501 and 503 are contiguous with memory region 502. For example, virtual memory page 501 is the first page below the memory region 502 and virtual memory page 503 is the first page above the memory region 502. An entry may be identified as a right candidate for coalescing if the search address, when rounded to the end address of the page containing the search address matches the starting virtual address of the entry. For example, as illustrated in FIG. 5(b), if the search address is located in memory page 501, when rounded to the nearest page, the search address will be equal to the starting virtual address of the memory region 502. Thus, if the search address is in memory page 501, the entry including memory region 502 may be identified as a right candidate for coalescing. In a similar manner, as illustrated in FIG. 5(c), if the search address is located in memory page 503, when the search address is rounded down to the first address of the page, the search address will be equal to the ending virtual address of the entry. When this occurs, the entry is determined to be a left candidate for coalescing.

The lookup procedure may identify a left candidate for coalescing, a right candidate for coalescing, or both. Once an entry has been identified as a candidate for coalescing, the lookup procedure preferably stores the index for the entry. (step ST9) Once the lookup procedure determines whether a given entry is a candidate for coalescing, the lookup procedure then determines whether all entries have been searched. (step ST10) If all entries have been searched, and no match has been found, the lookup procedure determines that a cache miss has occurred and initiates the insertion procedure. (step ST11) If, on the other hand, the lookup procedure determines that all entries have not been searched, the lookup procedure preferably updates the index and accesses the next entry. (step ST12) The lookup procedure then returns to step ST2 for reading and comparing the addresses in the new cache entry to the search address. In this manner, the lookup procedure steps through all of the entries in the cache until an entry having the address range of interest is found. If no entry satisfies the search criteria, candidates for coalescing that are identified are stored for later use. If no entry satisfies the search criteria and no candidates for coalescing are identified, the insertion procedure may be invoked to locate the data of interest externally to the hash table.

Figure 4A:
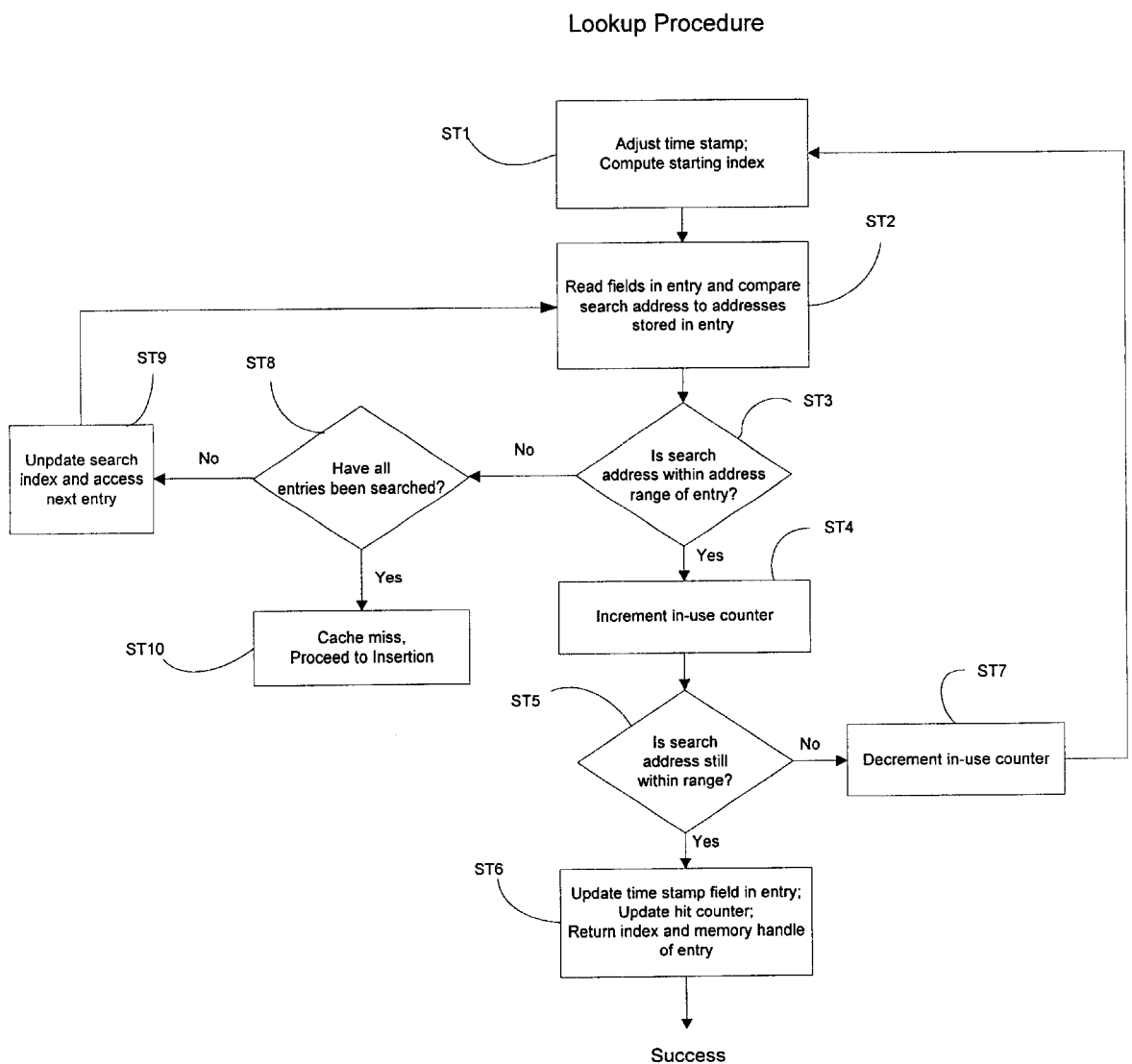
FIG. 4(a) is a flow chart illustrating exemplary steps that may be performed by a lookup procedure for locating information in an indexed computer data structure according to an alternative embodiment of the present invention.

As stated above, identifying candidates for coalescing is an optional feature of the invention. FIG. 4(a) illustrates an alternative embodiment of the lookup procedure without steps for identifying candidates for coalescing. Steps ST1, ST2, and ST4–ST7 are similar to the corresponding steps in FIG. 4 and need not be further explained. In step ST3, after determining that a search address is not in the virtual address range of an entry, the lookup procedure may determine whether all entries have been searched (step ST8), i.e., without identifying whether the entry is a candidate for coalescing. If all entries have not been searched, the lookup procedure may update the search index and access the next entry. (step ST9) In step ST8, if the lookup procedure determines that all entries have been searched and no matching entries were found, a cache miss occurs and the insertion procedure may be invoked. (step ST10).

Figure 6:
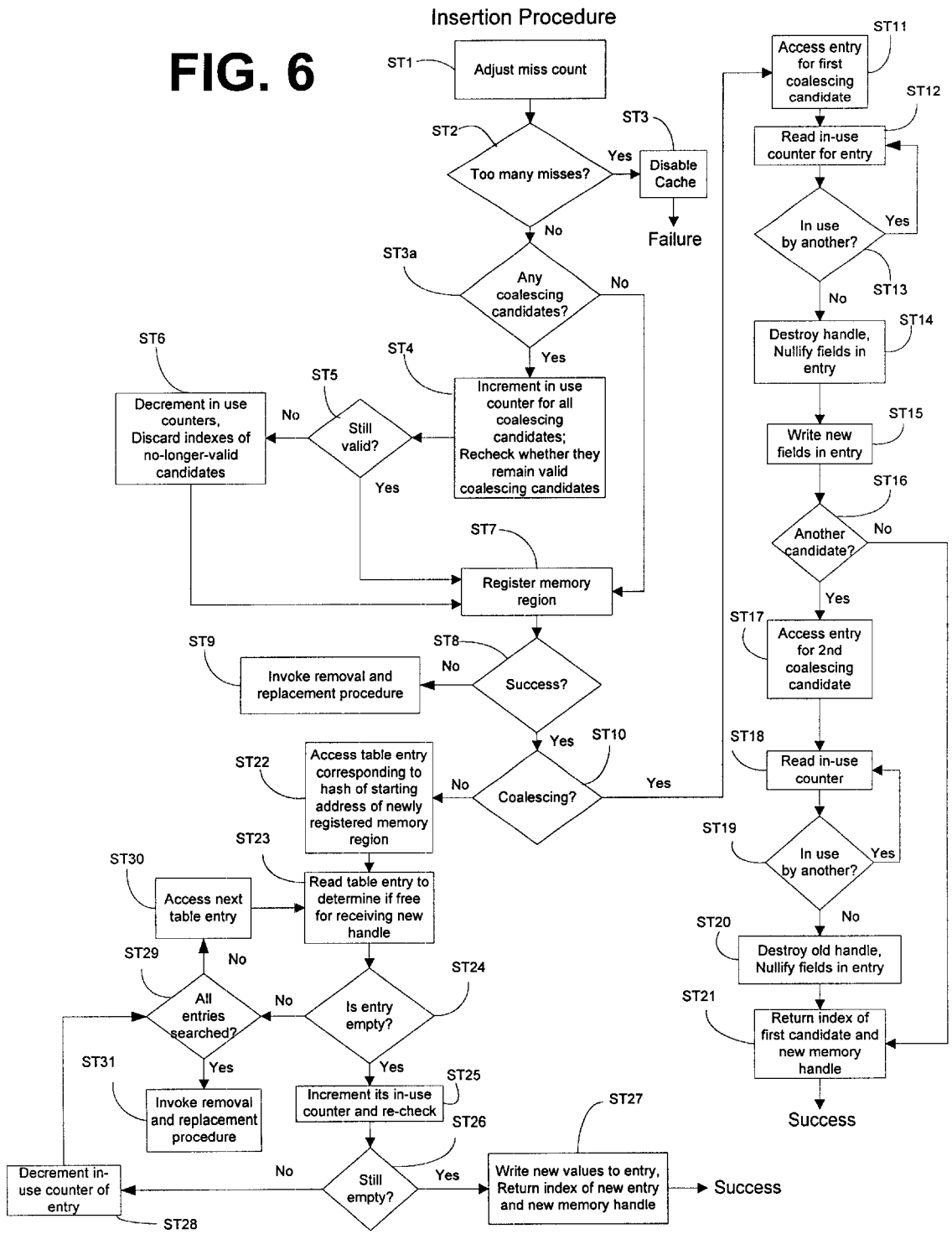
FIG. 6 is a block diagram illustrating exemplary steps that may be performed by an insertion procedure for inserting information in an indexed computer data structure according to an embodiment of the present invention.

FIG. 6 illustrates exemplary steps that may be performed by the insertion procedure for inserting an entry into an indexed computer data structure according to the embodiment of FIG. 2. The insertion procedure may be initiated when the lookup procedure results in a cache miss. In other words, when the insertion procedure is invoked, the lookup procedure failed to find an entry corresponding to the search key. However, the lookup procedure may have identified one or more entries as candidates for coalescing. Accordingly, the insertion procedure may include steps for externally obtaining a memory handle corresponding to the search key, storing the new memory handle in the table, and coalescing any previously identified candidates. Alternatively, if the lookup procedure did not include steps for identifying coalescing candidates, the steps for coalescing entries may be omitted from the insertion procedure. The embodiment illustrated in FIG. 6 includes steps for coalescing any previously identified candidates. The insertion procedure may also include optional steps for monitoring the performance of the cache and disabling the cache when the cache is no longer effective. The embodiment illustrated in FIG. 6 includes steps for monitoring and disabling the cache. In an alternative embodiment, the steps for monitoring and disabling the cache may be omitted.

In order to monitor the performance of the cache, in step ST1, the insertion procedure adjusts a miss count associated with the cache. Since the insertion procedure was invoked because the lookup procedure failed to locate an entry, the miss count may be increased by one. The miss count may be used to determine whether the cache is efficient. For example, in step ST2, if the insertion procedure determines that the miss count exceeds a predetermined percentage value, e.g., relative to the total number of cache accesses, the cache may be disabled. (step ST3) Alternatively, the miss count may be compared with the hit count to determine whether or not to disable the cache. Once the cache is disabled, threads may perform memory registration operations to obtain memory handles, without first accessing the cache. If the miss count does not exceed the predetermined percentage value, the insertion procedure may execute the remaining steps for inserting an entry in the cache. In this manner, the methods and systems for accessing and storing data in an indexed data structure optionally include an insertion procedure that disables a poorly performing cache. In an alternative embodiment, since monitoring the performance of the cache is preferably an optional feature of the invention, steps ST1–ST3 may be omitted.

In step ST3a, if the lookup procedure included steps for identifying coalescing candidates, the insertion procedure preferably determines whether any candidates were identified. If one or more candidates were identified, the insertion procedure may increment the in-use counter for any entries identified as coalescing candidates and recheck whether the candidates remain valid. (steps ST4 and ST5) The reason for this check is that the entries identified as candidates for coalescing may have been modified or replaced by other threads between the time when the entries were identified as candidates for coalescing during the lookup procedure and the time when the insertion procedure increments the in-use counters associated with the candidates. Accordingly, in step ST6, if the insertion procedure determines that the entries are no longer valid candidates, the insertion procedure preferably decrements the in-use counters of the entries and discards the entries as coalescing candidates.

In step ST7, the insertion procedure registers a memory region corresponding to the search address. The size of the memory region being registered depends on a variety of factors, including the amount of memory needed for an I/O operation and whether there are any remaining candidates for coalescing. For example, the memory region being registered is preferably at least large enough to contain the data for the I/O operation for which the memory region is being registered. In addition, if there are any candidates for coalescing that remain after the second check, the memory region is preferably large enough to contain the memory required for the I/O operation and the memory regions of the candidates.

In step ST8, the insertion procedure determines whether the memory registration was successful. One reason that the memory registration may not have succeeded is that the memory region may have been larger than the amount of main memory available for registration. For example, in some I/O architectures, such as the VIA architecture, memory registration may include locking the new region in main memory. Some computer operating systems may limit the amount of main memory that can be locked by a thread or process. Thus, if the amount of memory sought to be registered is greater than the amount that the operating system will allow, the registration may fail. If the memory registration fails, the insertion procedure preferably calls or invokes the removal and replacement procedure (step ST9) to de-register one or more currently registered memory regions and allow registration of the new memory region.

In the present example, the result of the memory registration is a memory handle used to qualify to virtual memory addresses to an I/O device. However, the present invention is not limited to performing an external memory registration to obtain data for which a lookup failed. For example, in the general case, if a cache lookup fails, step ST7 may include accessing a slower memory, such as a disk storage device, to obtain the data of interest.

After the insertion procedure determines that the memory registration was successful, the insertion procedure preferably performs steps for inserting the new memory handle in the table. In step ST10, the insertion procedure determines whether coalescing occurred in the memory registration. If coalescing occurred, the new entry encompasses the memory regions of one or more old entries. Thus, the insertion procedure preferably performs steps for removing the old entries from the table. Accordingly, in step ST11, the insertion procedure accesses the entry for the first coalescing candidate. Because the entry may be in use by another thread, the insertion procedure reads the in-use counter associated with the entry. (step ST12) The insertion procedure then determines whether the entry is in use by another thread, i.e., by checking whether the in-use counter is greater than one. (step ST13) If the in-use counter indicates that the entry is in use by another thread, the insertion procedure may re-read the counter until the in-use counter is one, i.e., until the current thread executing the insertion procedure is the only thread using the entry. When the in-use counter for the entry becomes one, the insertion procedure determines that the old handle is not in use and destroys the handle. The insertion procedure preferably also nullifies the remaining fields in the entry. (step ST14) Once the old values are destroyed, the insertion procedure preferably writes the new memory handle value and the new starting and ending address values to the entry. (step ST15) The insertion procedure preferably also updates the time stamp of the entry, if a time stamp field is included. The order in which the new fields are initialized may be important to prevent locking. An assignment to any of the fields in the entry may be used to indicate that the entry is valid. For example, assignment to the ending virtual address field may signify that the entry is valid. Accordingly, in such case, the insertion preferably assigns a value to the ending virtual address field of the entry last.

After writing the new memory handle and address values to the fields of the first coalescing candidate entry, the insertion procedure may check whether a second coalescing candidate was identified. (step ST16) If a second coalescing candidate was not identified, the insertion procedure may return the index of the first coalescing candidate and the new memory handle. (step ST21) If a second coalescing candidate was identified, the insertion procedure execute steps ST17–ST19 to access the entry corresponding to the second coalescing candidate and wait until the entry is no longer in use another thread. Once the entry is not being used by another thread, the insertion process may destroy the old handle and nullify the fields in the entry. (step ST20) Since the addresses and memory handle for the newly registered memory region were written in the entry for the first coalescing candidate, the insertion procedure may simply leave the values of the fields in the entry for the second coalescing candidate set to NULL. The table location for the entry for the second coalescing candidate can then be used to store new handles. After nullifying the fields in the second coalescing candidate entry, the insertion procedure may return the index of the first coalescing candidate and the new memory handle. (step ST21)

In step ST10, if the insertion procedure determines that coalescing is not being performed, either because there were no coalescing candidates when the procedure was invoked or because those that were present became invalid, after registering the new memory region, the insertion procedure preferably attempts to insert the new handle into an empty table entry. Accordingly, in step ST22, the insertion procedure may access the table entry corresponding to the hash of the starting address of the newly registered memory region.

After the insertion procedure accesses an entry, the insertion procedure reads the data in the entry to determine if the entry is empty. (steps ST23 and ST24) If the entry is empty, the insertion procedure may increment the in-use counter and recheck the entry to determine whether it is still empty. (steps ST25 and ST26) This rechecking prevents the insertion procedure from inserting data in the entry if another thread inserts data in the entry between steps between steps ST24 and ST25. If the entry is still empty, the insertion procedure may write the new memory handle and the new address values to the entry, and return the index of the new entry and the new memory handle to the calling thread. (step ST27) The insertion procedure may also update the time stamp of the new entry if the entry includes a time stamp field. If at step ST26 the entry is found no longer empty, its in-use counter is decremented. (step ST28)

In step ST24, if the entry being tested is not empty, or after step ST28, the insertion procedure determines whether all of the entries have been tested. (step ST29) If all of the table entries have not been tested, the insertion procedure may access the next table entry (step ST30) and repeat steps ST23–ST26 to determine whether the entry is available to receive the new handle. If all entries have been tested and none of the entries are empty, the insertion procedure may call the removal and replacement procedure. (step ST31)

Figure 6A:
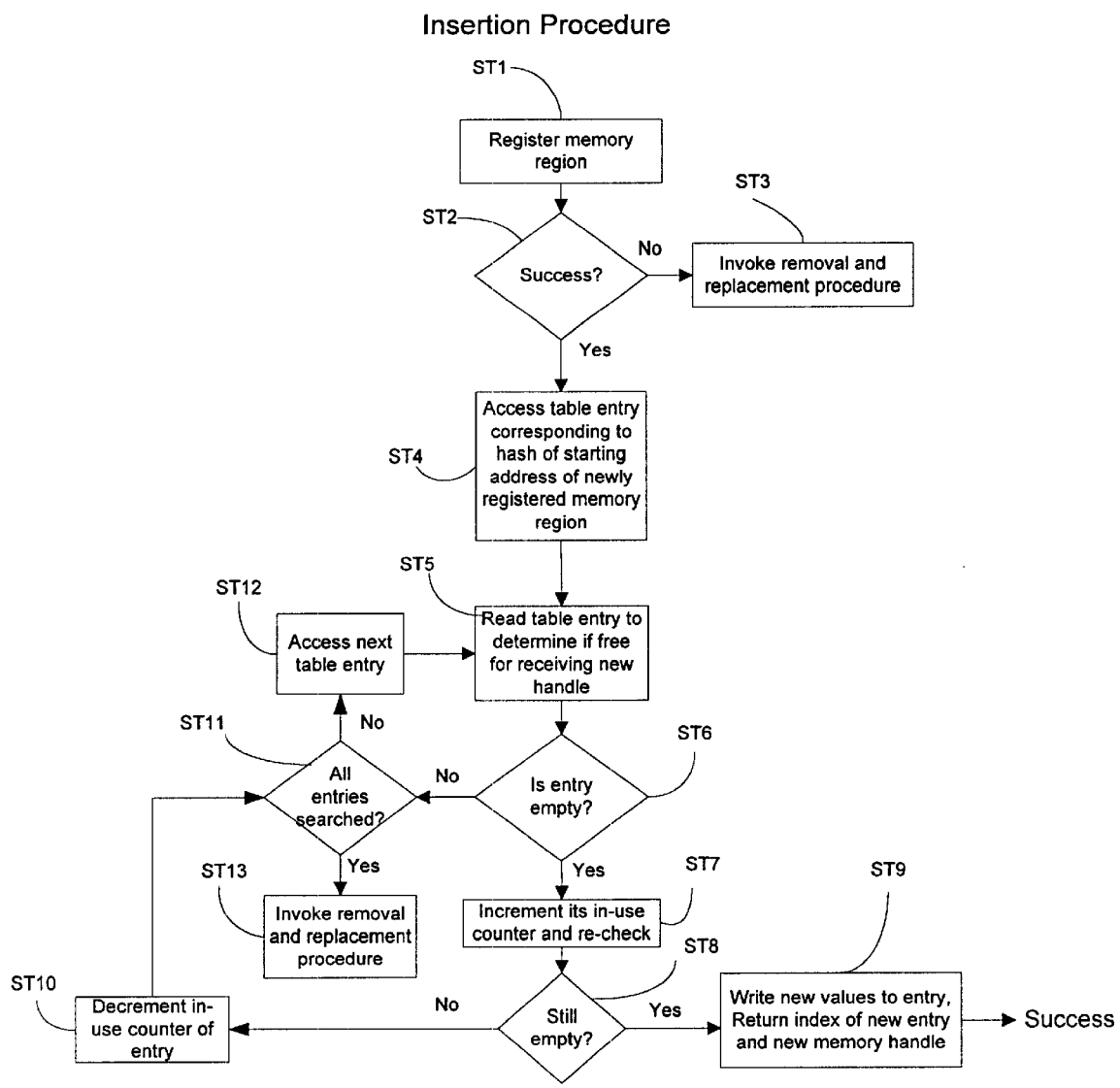
FIG. 6(a) is a block diagram illustrating exemplary steps that may be performed by an insertion procedure for inserting information into an indexed computer data structure according to an alternative embodiment of the present invention.

As stated above, since monitoring cache performance and coalescing entries are optional features of the invention, the steps for performing these functions may be omitted from the insertion procedure. FIG. 6(a) illustrates an alternative embodiment of the insertion procedure without steps for monitoring cache performance or coalescing entries. In step ST1, after a cache miss occurs, the insertion procedure registers a memory region corresponding to the search address. If the entries in the hash table contain data other than memory addresses, step ST1 may comprise obtaining data corresponding to the search key from memory external to the hash table. In step ST2, the insertion procedure determines whether the registration was successful. If the registration was not successful, the removal procedure may be executed to remove an entry and make room for the new entry. (step ST3) If the registration is successful, the insertion procedure may execute steps ST4–ST13 to insert the new entry in the table and return the index and memory handle of the new entry. Steps ST4–ST13 are similar to steps ST22–ST31 in FIG. 6 and need not be further explained.

FIG. 7 illustrates exemplary steps that may be performed by a removal and replacement procedure for removing and replacing entries in an indexed computer data structure according to an embodiment of the present invention. The removal and replacement procedure may be invoked by or after the insertion procedure when the hash table is full and a thread attempts to insert a new entry in the table. In the illustrated example, since the table is being used to cache memory handles used by multiple threads in I/O operations, the removal and replacement procedure preferably removes an entry that is not likely to be used in the near future. Accordingly, removal may be based on any number of criteria that indicate whether an entry is likely to be needed. For example, a randomly selected entry, an entry selected by use of a roving pointer, the least-used entry, the least-frequently-used entry, or the least-recently-used entry may be removed. In the illustrated embodiment, the removal and replacement procedure removes entries based on the time stamp value stored in the time stamp field of each entry, which indicates the least-recently-used entry.

In step ST1, the removal and replacement procedure sets a local variable TS to a predetermined large value. For example, the local variable TS may be set close to the current value of the counter used to set the time stamp values of an entry when the entry is used by a thread. The removal and replacement procedure may utilize the local variable TS to determine whether an entry is a candidate for removal. If the time stamp value of an entry is smaller than TS, the entry may be identified as a candidate for removal. Setting the initial value of TS to be close to or equal to the current counter value ensures that all or nearly all entries will be considered for removal.

After setting the initial value of TS, the removal procedure may access a first table entry. (step ST2) The first table entry accessed may be any entry in the table, since all of the entries are preferably considered as candidates for removal. After accessing the first table entry, the removal and replacement procedure may read the time stamp field and the in-use counter associated with the entry. (step ST3). The removal and replacement procedure may then determine whether the time stamp is less than TS and whether the in-use counter is zero. (step ST4) If either of the conditions is not satisfied, the entry is either in use or should not be removed because the entry was recently used. Accordingly, the removal procedure may then determine whether all entries have been searched (Step ST8). If all entries have not been searched, the removal and replacement procedure may access the next entry (step ST9) and repeat steps ST3 and ST4 to test the next entry.

In step ST4, if the removal and replacement procedure determines that the entry is not in use and the time stamp is less than TS, the removal and replacement procedure may increment the in-use counter of the entry (step ST5). In step ST6, the removal and replacement procedure rechecks the time stamp associated with the entry. This rechecking accounts for another thread accessing the entry and changing the time stamp between steps ST4 and ST5. If the removal and replacement procedure determines that the time stamp is no longer less than TS, the removal and replacement procedure may decrement the in-use counter of the entry (step ST10) and accesses the next entry, unless all entries have been searched. If all entries have been searched and no candidates for removal have been identified, the removal and replacement procedure may wait for a predetermined time period (step ST11 and ST12) and go to step ST1 to restart the removal procedure.

In step ST7, if the current entry remains a valid candidate for removal after the second checking of the time stamp, the removal and replacement procedure decrements the in-use counter of any entry previously identified as a candidate for removal, sets TS to the time stamp value of the newly identified removal candidate, and sets the index of the candidate for removal to the index of the newly identified candidate. The removal and replacement procedure then determines whether all entries have been searched. (step ST8) If all entries have not been searched, the removal and replacement procedure accesses the next entry and utilizes the new value of TS to compare with the time stamp of the next entry. This process is repeated until all of the entries have been searched. If all entries have been searched, then the candidate having the lowest time stamp value may be identified as the entry to be removed. Accordingly, in step ST13, the removal and replacement procedure may replace the entry with the entry sought to be inserted in the insertion procedure from which the removal and replacement procedure was called. The removal and replacement procedure may then release the old memory handle value. Releasing the old memory handle value may include deregistering the memory handle with the I/O device utilizing the memory handle. The removal procedure may then restart the lookup procedure so that the thread seeking to register the memory handle can retrieve the handle from the table. In this manner, the removal and replacement procedure identifies candidates for removal and replaces the entry with a new entry that is more likely to be used than the replaced entry.

Figure 8:
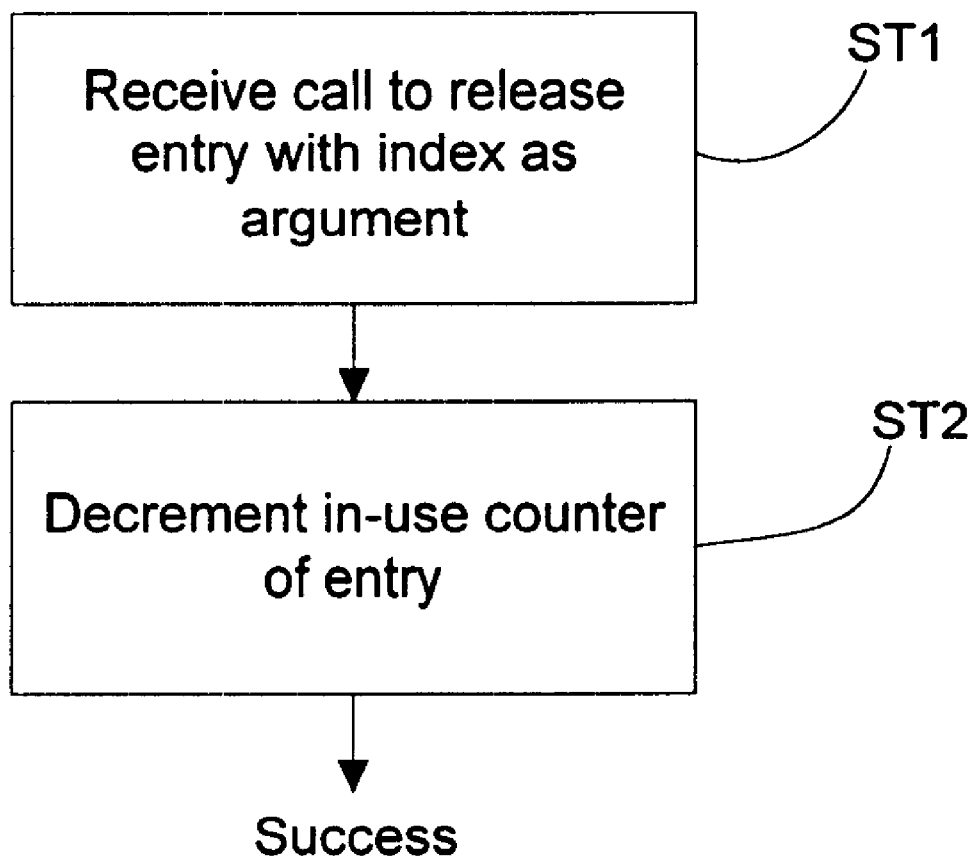
FIG. 8 is a flow chart illustrating exemplary steps that may be performed by a release procedure for releasing an entry in an indexed computer data structure according to an embodiment of the present invention.

Once the lookup procedure returns the index and the memory handle corresponding to the new entry in the table, and the thread executing the lookup procedure completes use of the memory handle, the thread may call the release procedure to decrement the in-use counter associated with the entry. FIG. 8 illustrates an exemplary release procedure for releasing an entry according to an embodiment of the invention. In step ST1, the release procedure receives a request to release an entry with the index of the entry as an argument. In step ST2, the release procedure decrements the in-use counter of the entry. Since the in-use counter was previously incremented by the thread calling the lookup procedure, after the release procedure, the in-use count will no longer reflect usage by the current thread. As a result of calling the release procedure after completing usage of an entry, the lock-free methods and systems for accessing and storing information in an indexed computer data structure are balanced with regard to the treatment of the in-use counter.

As stated above, the lock-free methods and systems for accessing and storing information in an indexed computer data structure may be used to cache memory handles used in I/O operations to increase the speed of I/O operations. Some I/O architectures, such as the virtual interface architecture may require virtual memory regions used in I/O operations to be registered with an I/O device before requesting I/O operations. In the VIA architecture, once a memory handle is registered with an I/O device, it can be reused in subsequent I/O operations. The lock free methods and systems for accessing and storing data in an indexed computer data structure according to any of the embodiments previously described can be used to increase the speed of retrieving previously-registered memory handles and allow concurrent access to a table containing the memory handles without locks.

Figure 9:
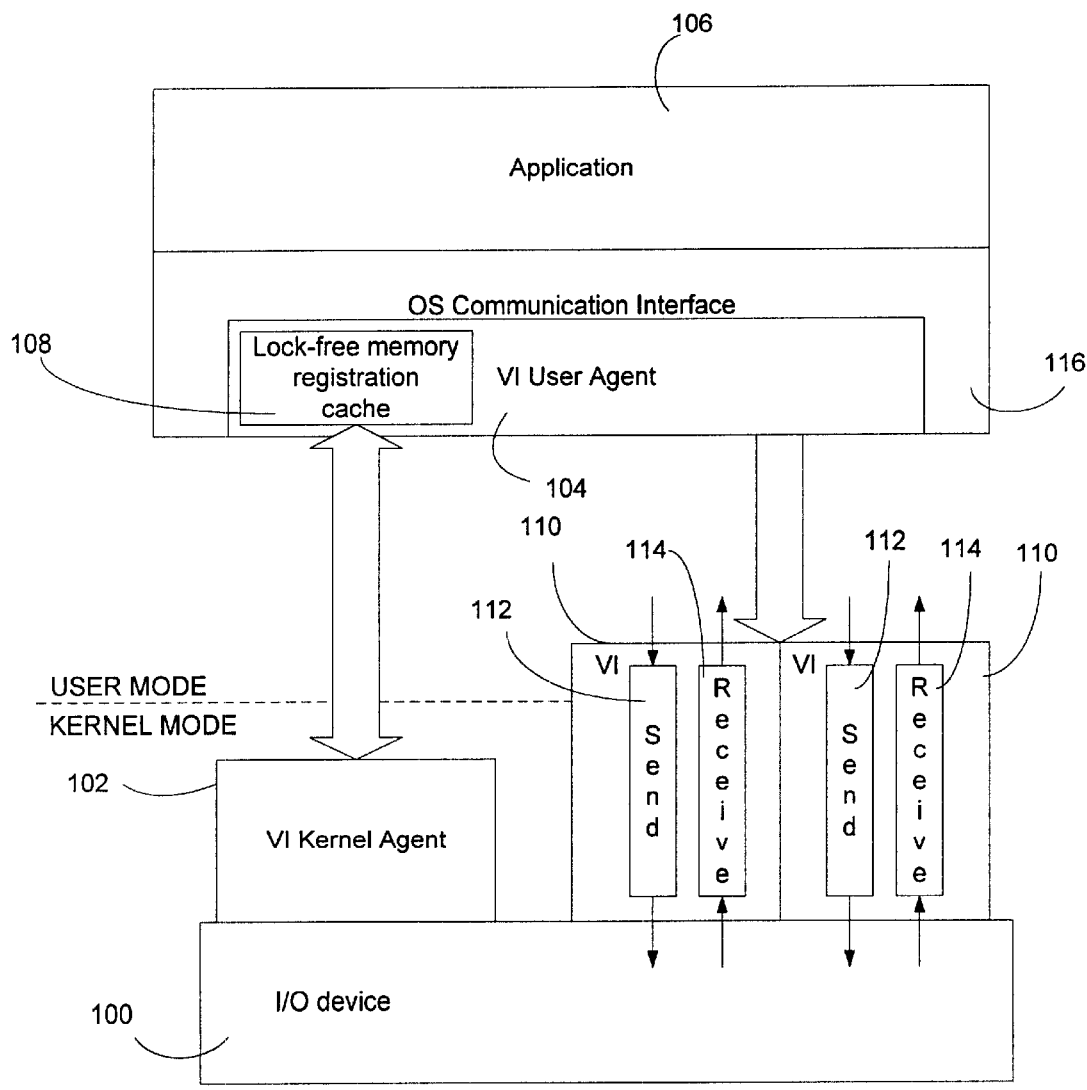
FIG. 9 is a block diagram illustrating exemplary hardware and software components of an I/O system according to the virtual interface architecture.

FIG. 9 is an architectural block diagram of hardware and software components of the Virtual Interface Architecture system including a lock-free memory registration cache according to an embodiment of the present invention. In the illustrated system, the I/O device 100 may comprise a network interface adapter capable of sending and receiving data over a network. The I/O device 100 may comprise any type of network adapter capable of high-speed communications, for example, an Ethernet card, such as a gigabit Ethernet card. For example, the I/O device 100 may translate virtual memory addresses to physical memory addresses based on handles supplied in I/O requests.

The present invention is not limited to caching memory handles for a network interface adapter. The lock-free memory registration cache may be utilized with any I/O device that accesses data stored at virtual memory addresses. For example, the lock-free memory registration cache may be used to cache audio data for an audio device, such as a sound card. In another alternative embodiment, the lock-free memory registration cache may be used to cache video data for a video device, such as a video card. In yet another alternative embodiment, the lock-free memory registration cache may be used to cache any type of data for a storage device, such as a disk storage device or a tape storage device.

A virtual interface (VI) kernel agent 102 is the device driver for the I/O device 100. The VI kernel agent 102 is preferably a component of the operating system executing on the host machine in kernel mode. The VI kernel agent 102 may receive memory registration requests from a VI user agent 104, register memory regions with the I/O device 100, and return memory handles to the VI user agent 104. Because memory registration is a kernel mode operation, registration may be processor-intensive. Accordingly, it may be desirable to store previously registered memory handles in a cache accessible by the VI user agent 104.

Accordingly, it may be desirable to store previously registered memory handles in a cache accessible by the VI user agent 104.

The present invention is not limited to caching memory handles for a user-mode application, such as the VI user agent 104. For example, in an alternative embodiment of the invention, the lock-free memory registration cache can be used to cache memory handles or any other data for a kernel mode application, such as a file system or another module that utilizes the I/O device 100 and is executed by threads running in kernel mode. Thus, the dashed line separating user mode and kernel mode applications in FIG. 9 is intended to be illustrative of one embodiment of the invention, rather than a required feature.

The VI user agent 104 receives I/O requests from an application 106, converts the requests to descriptors recognizable by the I/O device 100, and requests memory registration from the VI kernel agent 102. In order to decrease latency in retrieving previously registered memory handles, the VI user agent 104 may include a lock-free memory registration cache 108. The lock-free memory registration cache may comprise an indexed computer data structure used to store memory handles previously registered with the I/O device 100. In a preferred embodiment, the lock-free memory registration cache 108 comprises a hash table. Each entry in the hash table preferably includes the fields illustrated in FIG. 3, i.e., starting and ending virtual memory address fields, a memory handle field, and an in-use counter field. Each entry may also include a time stamp field, if a time-based removal condition is utilized. Alternatively, if a time-based removal condition is not utilized, the time stamp field may be omitted. The VI user agent 104 preferably includes lookup, insertion, removal and replacement, and release procedures for accessing and storing entries in the cache 108.

In addition to receiving memory registration requests, the VI kernel agent 102 may establish and break the connections with remote machines. The VI kernel agent 102 may also manage one or more virtual interfaces, such as VI's 110 to provide communication interfaces between a process, such as the application 106, and the I/O device 100.

Each virtual interface 110 may comprise a send queue 112 and a receive queue 114. In order to request an I/O operation, the VI user agent 104 posts descriptors to the send and receive queues. A descriptor is a data structure specifying information to assist the I/O device 100 in processing an I/O request. For example, if the I/O operation requested is a "Winsock" send( ) operation, the descriptor may include the starting virtual memory address of the buffer to be sent, the length of the buffer, and the memory handle for the memory region containing the buffer. If the I/O operation is a "Winsock" recv( ) operation, the descriptor may include the starting virtual address of the buffer where data received from a remote location is to be stored, the length of the buffer, and the memory handle for the memory region containing the receive buffer. The descriptor may also include control codes indicating the type of operation being performed.

In order to allow applications to communicate with the VI kernel agent and the virtual interfaces 110 using standard I/O functions, the illustrated architecture includes an operating system communication interface 116. The operating system communication interface may comprise any standard communications library or libraries for performing network I/O, e.g., sockets, MPI, cluster, or other communications library.

The application 106 may comprise any user mode network communications application, e.g., a web browser. The application 106 may request I/O operations from the I/O device 100 using standard communications functions provided by the operating system communications interface 116. Because the I/O device 100 may require memory regions used in I/O requests to be registered before performing I/O operations, and because most applications do not have code for handling memory registration, the VI user agent 104 preferably performs memory registration transparently to the application. For example, memory registration may be performed automatically in response to each I/O request. However, because the VI user agent preferably stores memory handles for previously registered memory regions in the lock-free memory registration cache 104, the time required to perform I/O operations is greatly decreased.

Figure 10:
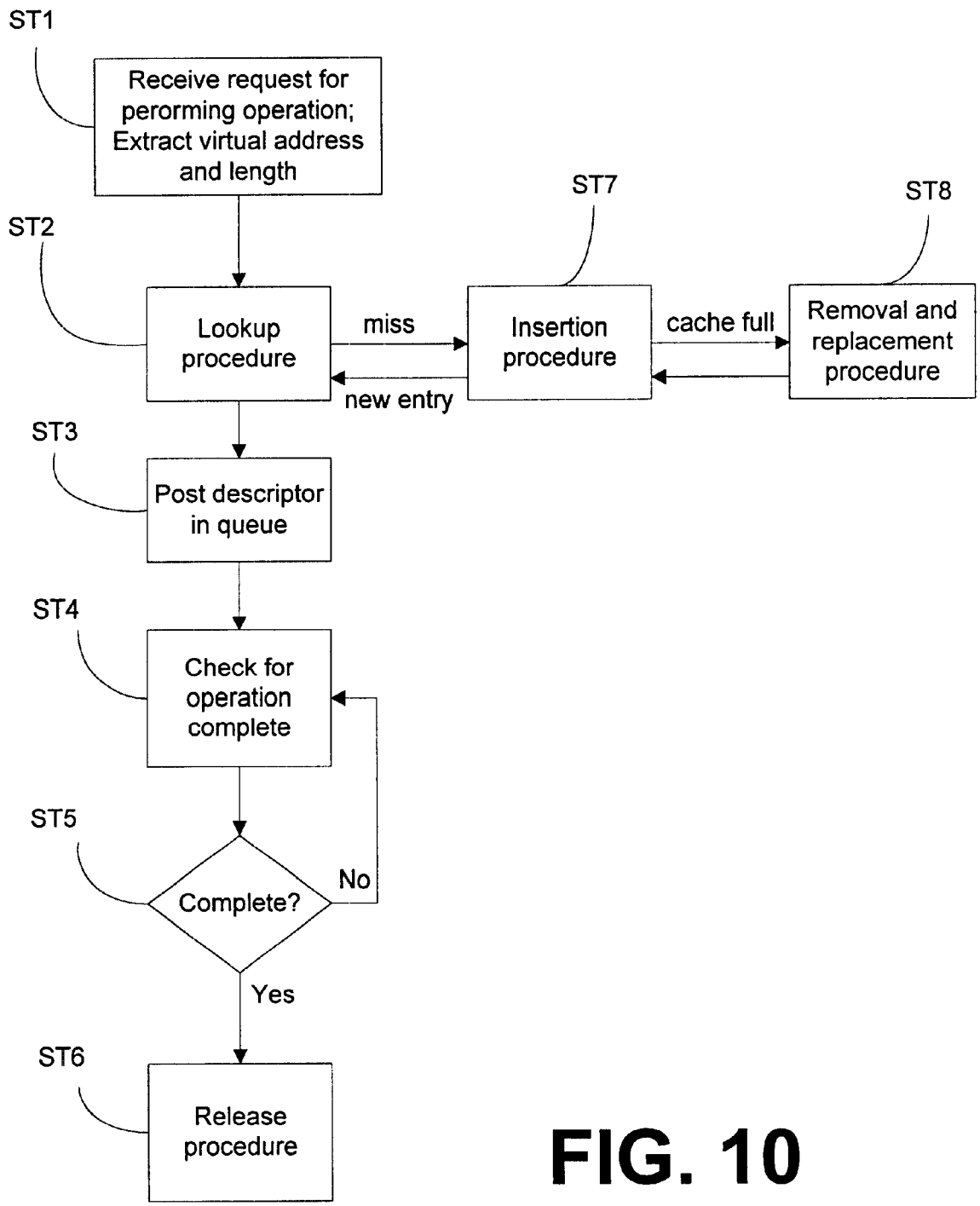
FIG. 10 is a flow diagram illustrating exemplary steps that may be performed by a VI user agent in response to a request for sending data to or receiving data from a memory location specified by a virtual memory address according to an embodiment of the present invention.

FIG. 10 illustrates exemplary steps that my be performed by the VI user agent in response to an operation for sending data from or receiving data into a virtual memory address. In step ST1, the VI user agent receives the request to send or receive data. The VI user agent may extract the virtual memory address and length of a buffer from the request. In step ST2, the VI user agent may perform a lookup procedure to locate a memory handle corresponding to the virtual memory address specified in the request. The lookup procedure may be the lookup procedure illustrated in FIG. 4 or the lookup procedure illustrated in FIG. 4(a). If the lookup procedure is successful in retrieving a memory handle for the virtual memory address operation from the hash table, i.e., if a hit occurred, the VI user agent may build the descriptor including the new memory handle and post the descriptor in the appropriate queue, depending on the type of operation being requested. (step ST3) The VI user agent may also ring the doorbell associated with the queue to notify the I/O device of the posting of the descriptor. In step ST4, the VI user agent checks whether the I/O operation has been completed. For example, the VI user agent may poll the queue in which the descriptor was posted to determine whether the descriptor has been processed. If the descriptor has not been processed, the VI user agent preferably continues polling. If the descriptor has been processed, the VI user agent preferably calls a release procedure to release the entry containing the memory handle used in the I/O operation. (step ST6) The release procedure is preferably the release procedure illustrated in FIG. 8. The release procedure decrements the in-use counter associated with the entry. By calling the release procedure after completing use of the handle, the VI user agent allows other threads to remove or replace the entry with an entry more likely to be used in subsequent I/O operations.

In step ST2, if the lookup procedure fails to locate a memory handle in the hash table corresponding to the virtual memory address from the request, a cache miss occurs. When a cache miss occurs, the insertion procedure may be called automatically to register the memory region, obtain a new memory handle, and store the new memory handle in the hash table. (step ST7) The insertion procedure may be the insertion procedure illustrated in FIG. 6 or the insertion procedure illustrated in FIG. 6(a). If the table is full, the insertion procedure preferably calls the removal and replacement procedure to remove an old entry from the table and replace the old entry with the new entry. (step ST8) The removal procedure is preferably the removal procedure illustrated in FIG. 7. Once the new entry containing the memory handle is inserted in the hash table, the VI user agent can build the descriptor for the I/O operation and post the descriptor in the appropriate queue. Subsequent operations that utilize the same memory region will proceed without a new registration since the entry is now stored in the table.

The present invention is not limited to the steps illustrated in FIG. 10 for utilizing the lock-free memory registration cache. For example, multiple threads may execute the steps illustrated in FIG. 10 to concurrently access an entry and request a plurality of I/O operations from one or more virtual interfaces. In addition, the operations relating to virtual memory addresses are not limited to I/O operations for sending or receiving data in response to "Winsock" send( ) and "Winsock" recv( ) operations. For example, steps similar to those in FIG. 10 may be executed to receive data from other processes or devices, and for many other operations. For example, the steps illustrated in FIG. 10 may be used to implement a lock-free memory registration cache for remote direct memory access (RDMA) read and write operations. In order to perform RDMA operations, a communication provider, such as the "Winsock" communication provider software, may include computer-executable instructions for converting RDMA requests to or from virtual memory addresses into descriptors in a manner similar to the manner in which the VI user agent converts "Winsock" send( ) and "Winsock" recv( ) requests into descriptors. Because the RDMA requests may include virtual memory addresses, I/O devices processing the requests may require memory handles to qualify the virtual memory addresses. Thus, the lock-free memory registration cache illustrated in FIG. 9 and the associated lookup, insertion, removal and replacement, and release procedures may be used to cache memory handles used in RDMA operations. Other operations relating to virtual memory addresses that may use a lock-free memory registration cache according to the invention include displaying video data on a computer display device, communicating audio data to or from an audio device, and retrieving and storing any type of data from a storage device.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. A method for locating entries in an indexed computer data structure comprising:

executing a first thread for performing a lookup for a first entry in an indexed computer data structure, locating the first entry, and accessing information stored in the first entry; and while the first thread accesses the information in the first entry, allowing a second thread to concurrently access the information stored in the first entry wherein performing the lookup comprises:

locating the first entry based on a predetermined relationship between a search and one or more keys associated with the first entry;

rechecking the key associated with the first entry to determine whether the predetermined relationship between the search key and the key associated with the first entry still exists; and in response to determining that the predetermined relationship still exists, updating a hit counter associated with the indexed computer data structure and returning the information from the first entry wherein the hit counter is used in measuring performance of the indexed computer data structure.

2. A removal and replacement procedure for removing and replacing entries in an indexed computer data structure, the removal and replacement procedure comprising computer-executable instructions embodied in a computer-readable medium for performing steps comprising:

accessing a first entry in an indexed computer data structure;

reading an in-use counter associated with the first entry to determine whether the entry is in use;

determining whether a predetermined removal condition is satisfied;

in response to determining that the first entry is not in use and that the predetermined removal condition is satisfied, incrementing the in-use counter associated with the first entry and re-checking whether the predetermined removal condition remains satisfied;

in response to determining that the predetermined removal condition remains satisfied, identifying the first entry as a candidate for removal;

decrementing an in-use counter of a previously identified candidate for removal;

storing an index of the first entry as an index of the candidate for removal;

setting the predetermined removal condition to a value associated with the first entry;

after identifying the first entry as a candidate for removal, determining whether all entries in the indexed computer data structure have been tested as candidates for removal;

in response to determining that all of the entries have been tested, writing new values to fields in the first entry; and in response to determining that all of the entries have not been tested, accessing a second entry to determine whether the second entry is a candidate for removal.

3. The removal and replacement procedure of claim 2 wherein the computer-executable instructions for accessing the second entry include instructions for:

reading an in-use counter of the second entry to determine whether the second entry is in use;

determining whether the predetermined removal condition is satisfied for the second entry;

in response to determining that the first entry is not in use and that the predetermined removal condition is satisfied, incrementing the in-use counter associated with the second entry and re-checking whether the predetermined removal condition remains satisfied; and in response to determining that the predetermined removal condition remains satisfied, identifying the second entry as a candidate for removal and discarding the first entry as a candidate for removal.

4. The removal and replacement procedure of claim 2 wherein determining whether a predetermined removal condition is satisfied comprises comparing a time stamp value of the first entry with a predetermined time stamp value and determining that the predetermined removal condition is satisfied when the time stamp value of the first entry is less than the predetermined time stamp value.

5. The removal and replacement procedure of claim 2 wherein determining whether a predetermined removal condition is satisfied is based on a random or pseudo-random number.

6. The removal and replacement procedure of claim 2 wherein determining whether a predetermined removal condition is satisfied is based on a roving index.

7. A virtual interface user agent comprising computer-executable instructions embodied in a computer-readable medium for performing steps comprising:

receiving a request for performing an operation for sending data from or receiving data into a memory location specified by a virtual memory address;

in response to the request, performing a lookup in an indexed computer data structure to locate a memory handle corresponding to the virtual memory address;

locating and accessing an entry containing the memory handle;

marking the entry in-use;

while accessing the entry, allowing concurrent access to the entry;

in response to locating the entry, building a descriptor including the virtual memory address and the memory handle;

posting the descriptor in a send queue of a virtual interface associated with an I/O device;

after posting the descriptor in the send queue, polling the send queue to determine when the I/O operation is complete; and in response to determining that the I/O operation is complete, executing a release procedure to undo the marking of the entry as being in-use.

8. The virtual interface user agent of claim 7 wherein the request comprises a request for transferring video data to or from a video device.

9. The virtual interface user agent of claim 7 wherein the request comprises a request for transferring audio data to or from an audio device.

10. A virtual interface user agent comprising computer-executable instructions embodied in a computer-readable medium for performing steps comprising:

receiving a request for performing an operation for sending data from or receiving data into a memory location specified by a virtual memory address;

in response to the request, performing a lookup in an indexed computer data structure to locate a memory handle corresponding to the virtual memory address;

locating and accessing an entry containing the memory handle;

marking the entry in-use;

while accessing the entry, allowing concurrent access to the entry;

in response to locating the entry, building a descriptor including the virtual memory address and the memory handle;

posting the descriptor in a receive queue of a virtual interface associated with an I/O device;

after posting the descriptor in the receive queue, polling the receive queue to determine when the I/O operation is complete; and in response to determining that the I/O operation is complete, executing a release procedure to undo the marking of the entry as being in-use.

11. A computer program comprising computer-executable instructions embodied in a computer-readable medium for coalescing entries in an indexed computer data structure, the computer-executable instructions comprising:

searching an indexed computer data structure for a first entry having one or more key values having a first relationship with a search key;

in response to failing to locate the first entry, identifying at least one second entry in the indexed computer data structure having a second relationship with the search key;

incrementing an in-use counter associated with the second entry;

after incrementing the in-use counter, determining whether the second relationship between the second entry and the search key still exists; and in response to determining that the second relationship still exists, coalescing the second entry with data corresponding to the search key.

* * * * *